US012647221B2

(12) United States Patent
Zhang

(10) Patent No.: US 12,647,221 B2
(45) Date of Patent: Jun. 2, 2026

(54) METHOD AND DEVICE FOR MULTIANTENNA PARAMETER CONFIGURATION IN WIRELESS COMMUNICATIONS

(71) Applicant: Apogee 5G Global, LLC, Plano, TX (US)

(72) Inventor: Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 185 days.

(21) Appl. No.: 18/134,569

(22) Filed: Apr. 14, 2023

(65) Prior Publication Data

US 2023/0299898 A1     Sep. 21, 2023

Related U.S. Application Data

(63) Continuation of application No. PCT/CN2021/123488, filed on Oct. 13, 2021.

(30) Foreign Application Priority Data

Oct. 14, 2020   (CN) .......................... 202011098573.4
Oct. 27, 2020   (CN) .......................... 202011160699.X

(51) Int. Cl.
*H04L 5/00*          (2006.01)
(52) U.S. Cl.
CPC .......... *H04L 5/0005* (2013.01); *H04L 5/0048* (2013.01)
(58) Field of Classification Search
None
See application file for complete search history.

(56) References Cited

U.S. PATENT DOCUMENTS 11,165,472 B2 *  11/2021  Jung ................. H04W 52/0216
11,363,627 B2 *   6/2022  Cirik ................. H04W 72/1273
(Continued)

FOREIGN PATENT DOCUMENTS

CN      108289017 A     7/2018
CN      109787727 A     5/2019
(Continued)

OTHER PUBLICATIONS

Notification to Grant Patent Right for Invention of Chinese patent application No. CN202011098573.4 dated Feb. 21, 2024.
(Continued)

*Primary Examiner* — Brian S Roberts
(74) *Attorney, Agent, or Firm* — Volpe Koenig

(57) ABSTRACT

A method and a device in a node for wireless communications. A first node receives a first information block and a second information block; and receives a first radio signal in a first time-frequency resource set; the first information block is used to determine a first transmission configuration parameter group, the first transmission configuration parameter group comprising multiple transmission configuration parameters; the multiple transmission configuration parameters are respectively used to determine multiple reference signals, with a first reference signal being one of the multiple reference signals; there is a first-type relationship between the first radio signal and the first reference signal, and there is a second-type relationship between the first radio signal and one of the multiple reference signals other than the first reference signal. The method given in the present application can enhance the performance of offsetting Doppler Shift in multi-TRP scenarios.

20 Claims, 7 Drawing Sheets

(56) References Cited

U.S. PATENT DOCUMENTS

| | | | | |
|---|---|---|---|---|
| 11,425,706 | B2 * | 8/2022 | Cirik | H04B 7/088 |
| 11,553,471 | B2 * | 1/2023 | Sun | H04L 5/0094 |
| 2019/0207722 | A1 * | 7/2019 | Gao | H04B 7/0626 |
| 2020/0374060 | A1 * | 11/2020 | Wang | H04L 25/0204 |
| 2022/0360408 | A1 * | 11/2022 | Jung | H04L 5/0058 |
| 2022/0369330 | A1 * | 11/2022 | Liu | H04W 74/0808 |
| 2024/0381413 | A1 * | 11/2024 | Fan | H04L 5/0053 |

FOREIGN PATENT DOCUMENTS

| | | | |
|---|---|---|---|
| CN | 110391890 | A | 10/2019 |
| CN | 110492913 | A | 11/2019 |
| CN | 110719156 | A | 1/2020 |
| CN | 111669259 | A | 9/2020 |
| CN | 111769921 | A | 10/2020 |
| WO | 2019067925 | A1 | 4/2019 |
| WO | 2020091545 | A1 | 5/2020 |
| WO | 2020143801 | A1 | 7/2020 |

OTHER PUBLICATIONS

First Office Action of Chinese patent application No. CN202011160699.X dated Jan. 12, 2024.

First Search Report of Chinese patent application No. CN202011098573.4 dated Feb. 19, 2024.

First Search Report of Chinese patent application No. CN202011160699.X dated Jan. 10, 2024.

CATT "On QCL for NR" 3GPP TSG RAN WG1 NR Ad-Hoc#2 R1-1710071 Jun. 30, 2017.

ISR received in application No. PCT/CN2021/123488 dated Jan. 14, 2022.

Huawei, HiSilicon Reference signal for fine time and frequency tracking 3GPP TSG RAN WG1 Meeting #90bis R1-1717308 Oct. 13, 2017.

Intel Corporation Corrections to QCL for NR 3GPP TSG RAN WG1 Meeting AH 1801 R1-1800320 Jan. 26, 2018.

Third Generation Partnership Project, "Technical Specification Group Radio Access Network; NR; Physical layer procedures for data (Release 16)," 3GPP TS 38.214 V16.3.0 (Sep. 2020).

Third Generation Partnership Project, Technical Specification Group Radio Access Network; NR; Radio Resource Control (RRC) protocol specification (Release 15),' 3GPP TS 38.331 V15.11.0 (Sep. 2020).

* cited by examiner

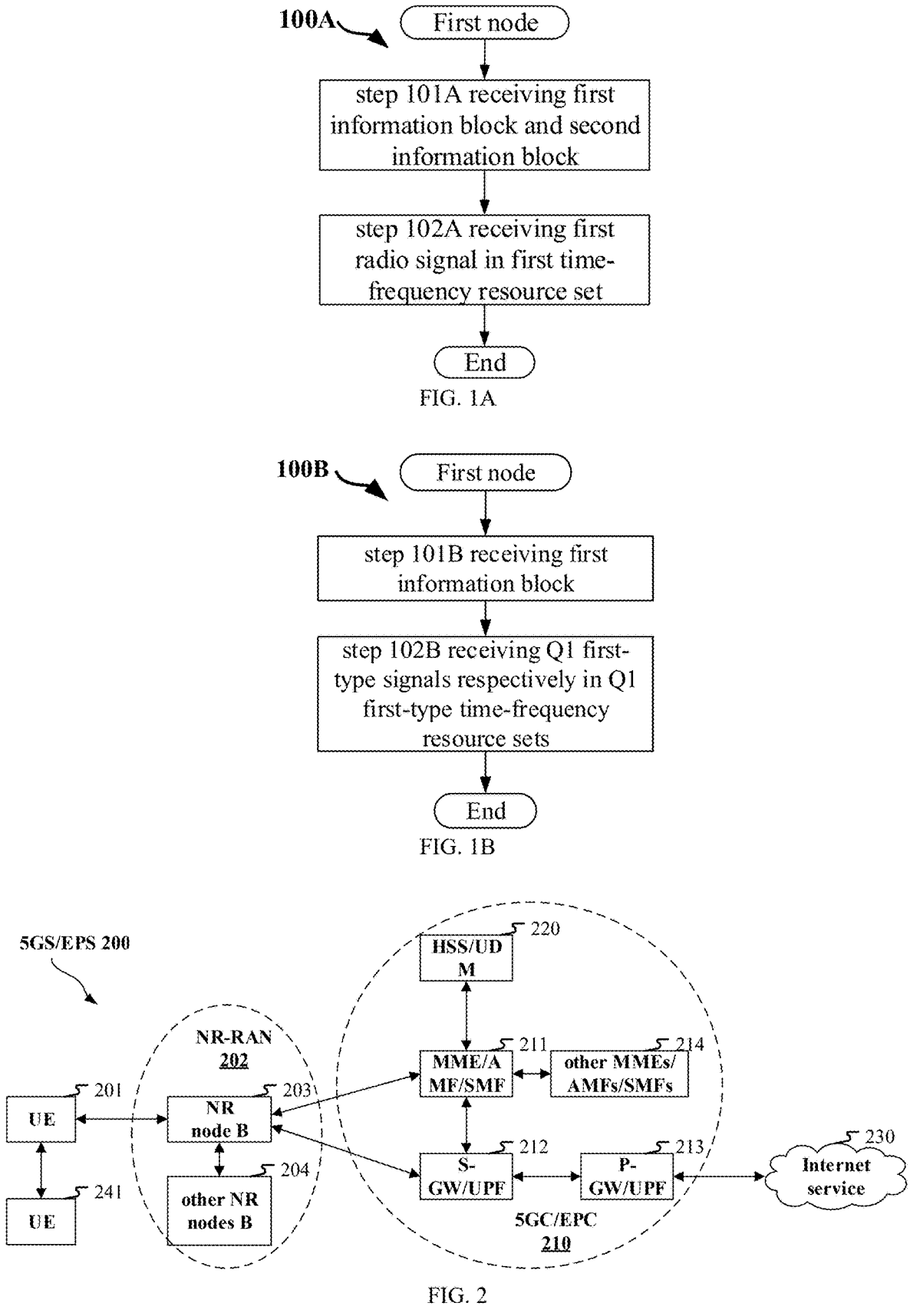

100A

First node step 101A receiving first information block and second information block step 102A receiving first radio signal in first time-frequency resource set End

First node step 101B receiving first information block step 102B receiving Q1 first-type signals respectively in Q1 first-type time-frequency resource sets End

FIG. 1B

5GS/EPS 200

HSS/UDM 220

NR-RAN 202

UE 201

NR node B 203 other NR nodes B 204

UE 241

MME/AMF/SMF 211 other MMEs/AMFs/SMFs 214

S-GW/UPF 212

P-GW/UPF 213

Internet service 230

5GC/EPC 210

FIG. 2

TRP1

Transmitting beam 1

Transmitting beam 2

TRP2

UE

TRP1

First reference signal

First radio signal

Third reference signal

First radio signal

TRP2

High-speed train

TRP1

First reference signal

First radio signal

Second reference signal

First radio signal

TRP2

High-speed train

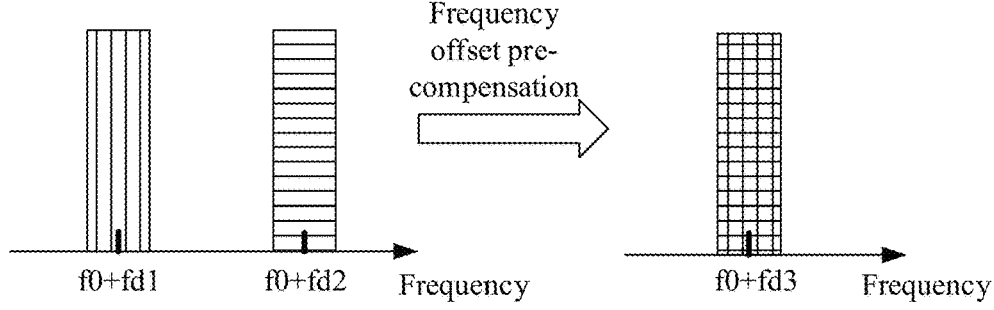
FIG. 8
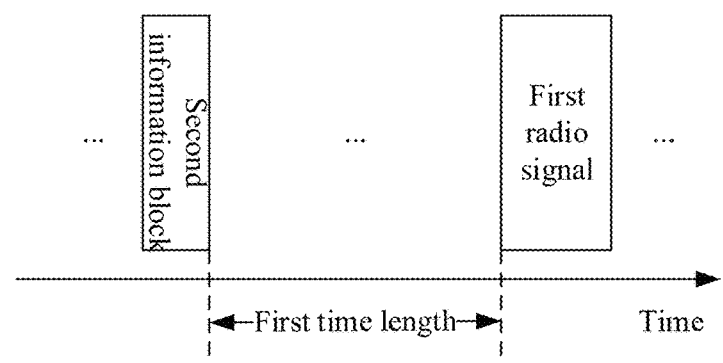
FIG. 9A
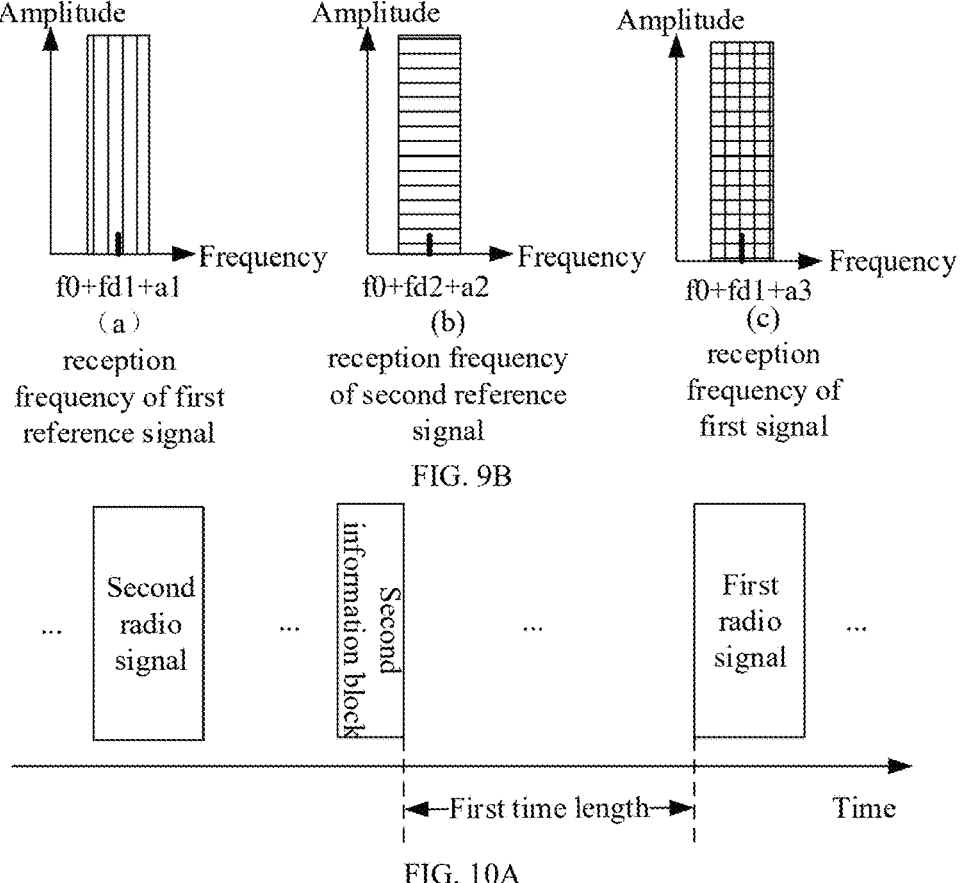
FIG. 9B
FIG. 10A

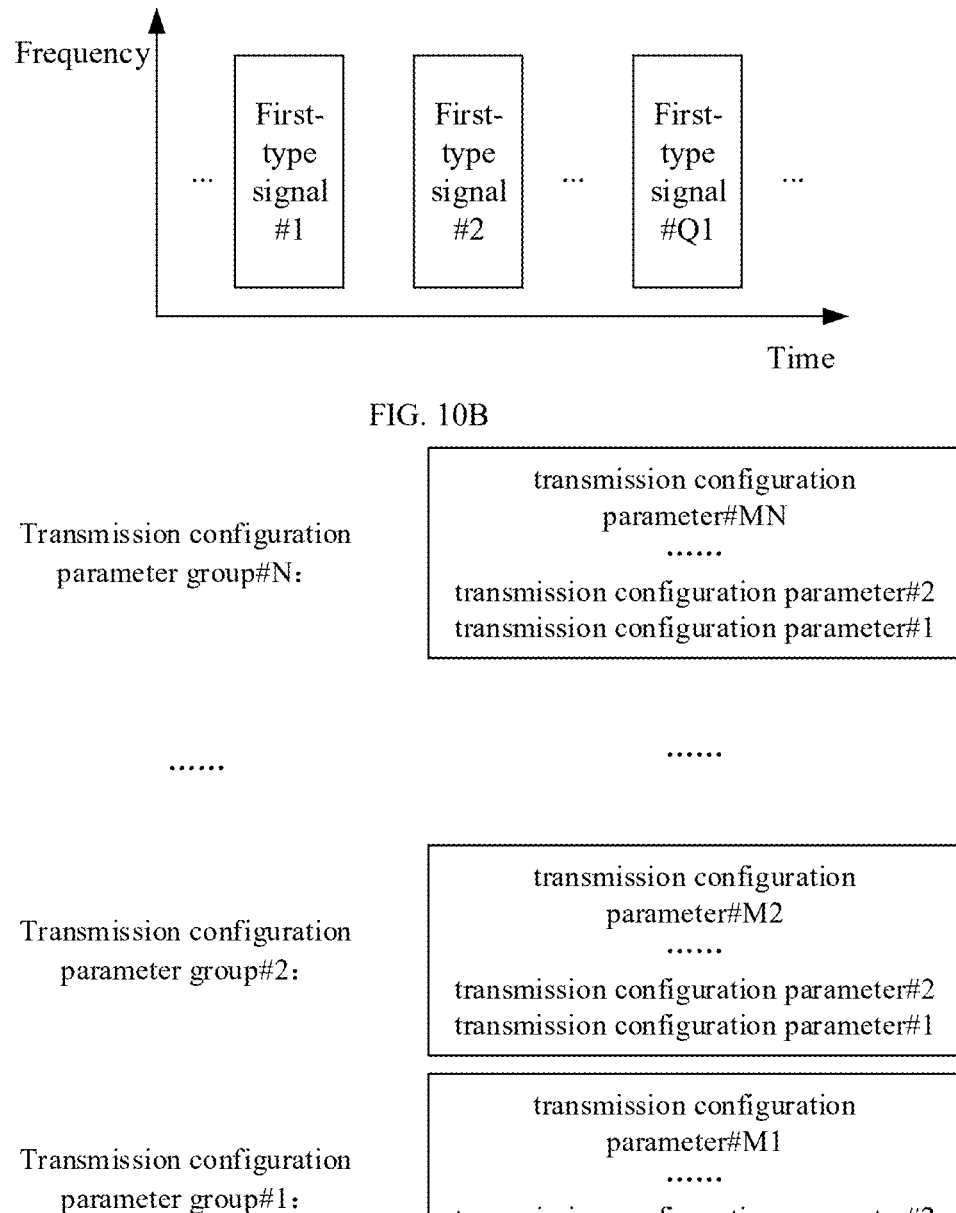

FIG. 10B

Transmission configuration parameter group#N:

transmission configuration parameter#MN
......
transmission configuration parameter#2
transmission configuration parameter#1

......

......

Transmission configuration parameter group#2:

transmission configuration parameter#M2
......
transmission configuration parameter#2
transmission configuration parameter#1

Transmission configuration parameter group#1:

transmission configuration parameter#M1
......
transmission configuration parameter#2
transmission configuration parameter#1

FIG. 11

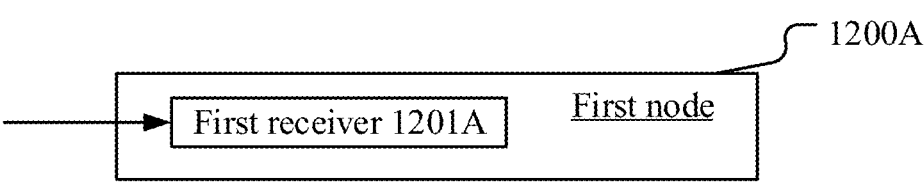

1200A

First node

First receiver 1201A

FIG. 12A

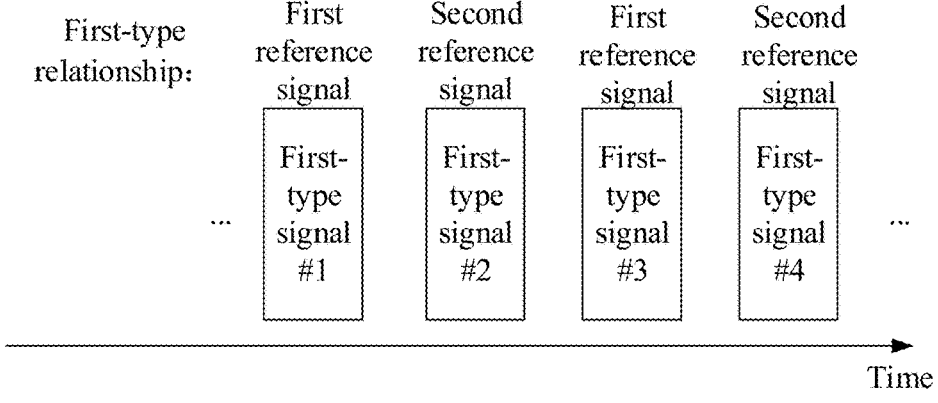
FIG. 12B
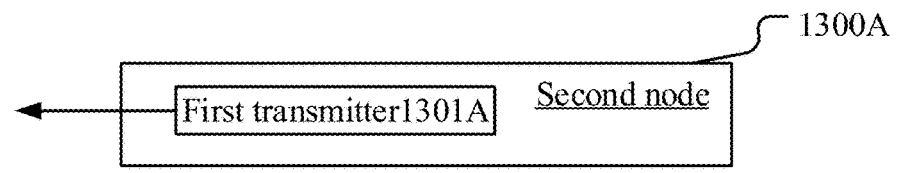
FIG. 13A
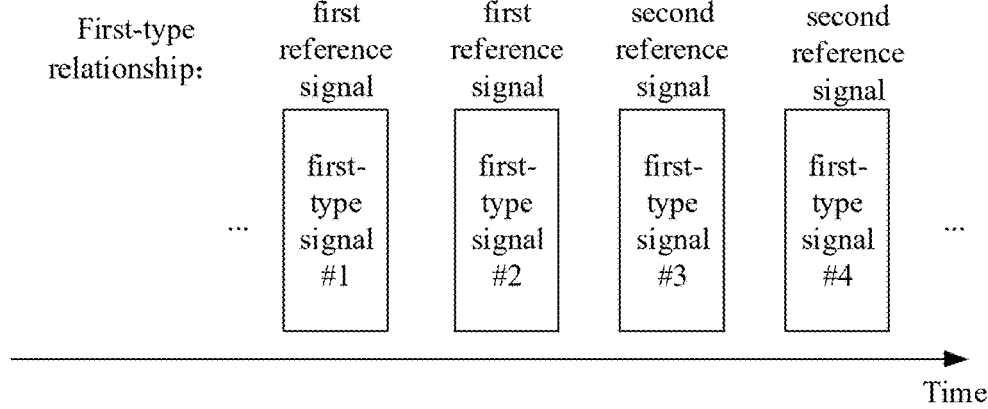
FIG. 13B
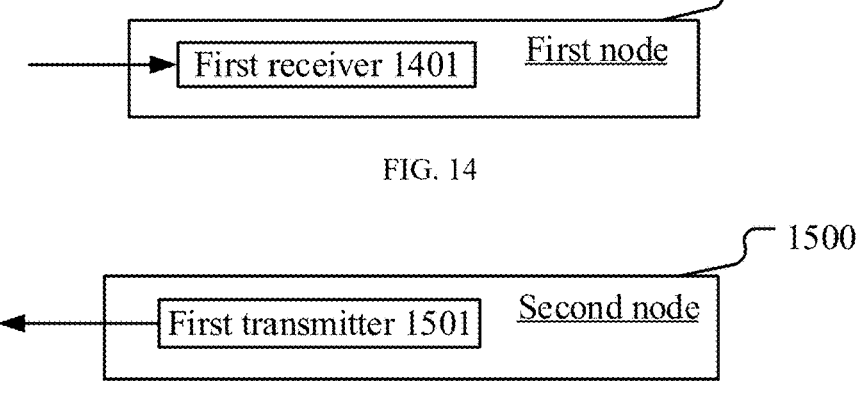
FIG. 14
FIG. 15

METHOD AND DEVICE FOR MULTIANTENNA PARAMETER CONFIGURATION IN WIRELESS COMMUNICATIONS

This application is the continuation of the international patent application No. PCT/CN2021/123488, filed on Oct. 13, 2021, and claims the priority benefit of Chinese Patent Application No. 202011098573.4, filed on Oct. 14, 2020, and claims the priority benefit of Chinese Patent Application No. 202011160699.X, filed on Oct. 27, 2020, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

The Multi-antenna technique is a crucial part in the 3rd Generation Partner Project (3GPP) Long-term Evolution (LTE) and New Radio (NR) systems. More than one antenna can be configured, at the communication node, e.g., a base station or a User Equipment (UE), to obtain extra degree of freedom in space. Multiple antennas form through beamforming a beam pointing in a specific direction to enhance the communication quality. When the multiple antennas belong to multiple Transmitter Receiver Points (TRPs)/panels, spatial differences between TRPs/panels can be taken advantage of to obtain extra diversity gains. Since the beam formed by multiple antennas through beamforming is generally narrow, beams from both sides of communications are required to be aligned for performing effective communications. When transmitting/receiving beams are out of sync due to factors like UE mobility, a drastic reduction of communication quality will be seen, and even worse, the communications may be failed, so it is necessary for beams to be updated in a timely manner.

SUMMARY

At the 3GPP Radio Access Network (RAN) #86 Plenary a Work Item (WI) of NR Release (R) has been approved, which includes enhanced multi-TRP transmission for supporting scenarios of high-speed train (HST)-Single Frequency Network (SFN). Inventors find through researches that a major challenge confronting signal transmission in the scenario of HST-SFN includes the impact of Doppler Shift on the performance of the receiver brought about by high-speed mobility. Besides, since the directions from different TRPs towards the UE are varied, signals transmitted from different TRPs will generate different Doppler Shifts at the UE's receiver, and the UE's receiver will receive copies of multiple signals with different center frequency points, which leads to difficulties in receiving signals.

To address the above problem, the present application provides a solution. It should be noted that although the present application only took the scenarios of beamforming and HST-SFN for example in the above statement, it also applies to other scenarios such as the LTE multi-antenna system, and mobility at medium-and-low speed, where similar technical effects can be achieved. Additionally, the adoption of a unified solution for various scenarios, including but not limited to beamforming, HST-SFN scenario, and LTE multi-antenna system, and medium-and-low-rate mobility scenarios, contributes to the reduction of hardcore complexity and costs. In the case of no conflict, the embodiments of any node and the characteristics in the embodiments may be applied to any other node, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving a first information block and a second information block; and receiving a first radio signal in a first time-frequency resource set, the second information block being used to indicate the first time-frequency resource set;

herein, the first information block is used to determine a first transmission configuration parameter group, the first transmission configuration parameter group comprising Q1 transmission configuration parameters, where the Q1 transmission configuration parameters are used together for receiving the first radio signal, Q1 being a positive integer greater than 1; the Q1 transmission configuration parameters are respectively used to determine Q1 reference signals, with a first reference signal being one of the Q1 reference signals; there is a first-type relationship between the first radio signal and the first reference signal, and there is a second-type relationship between the first radio signal and one of the Q1 reference signals other than the first reference signal, where the first-type relationship and the second-type relationship are different; a time interval between a time for receiving the second information block and a time for receiving the first time-frequency resource set is equal to a first time length, and a relative magnitude of the first time length and a first time threshold is used to determine the first reference signal out of the Q1 reference signals; the first time threshold comprises a time length of a positive integer number of multicarrier symbol(s).

In one embodiment, characteristics of the above method include: the first radio signal being transmitted in the form of SFN by Q1 TRPs, the Q1 transmission configuration parameters being respectively used by the Q1 TRPs for transmitting the first radio signal; the Q1 reference signals are respectively Tracking Reference Signals (TRS) transmitted by the Q1 TRPs; the first-type relationship comprises a Doppler Shift Quasi Co-location relationship; the second-type relationship does not comprise a Doppler Shift Quasi Co-location relationship.

In one embodiment, characteristics of the above method include: No Doppler Shift pre-compensation being performed for the first reference signal, instead the Doppler Shift pre-compensation being performed for any of the Q1 reference signals other than the first reference signal; the purpose of the Doppler Shift pre-compensation is to enable a same central frequency being shared by Q1 said first radio signals respectively transmitted by the Q1 TRPs at a receiver in the first node.

In one embodiment, characteristics of the above method include: the first reference signal being used to determine a reception frequency, while any reference signal among the Q1 reference signals other than the first reference signal being not used to determine a reception frequency.

In one embodiment, characteristics of the above method include: the Q1 transmission configuration parameters are respectively associated with Q1 transmitting beams.

In one embodiment, characteristics of the above method include: the Q1 transmission configuration parameters are respectively associated with Q1 TRPs.

In one embodiment, an advantage of the above method includes: when the first radio signal is transmitted by means of SFN by Q1 TRPs, one of the Q1 TRPs is used as an anchor for the reception frequency and the other TRPs are performed with Doppler Shift pre-compensation according to respectively associated Doppler Shifts, which enables Q1 said first radio signals respectively transmitted by the Q1 TRPs to be aligned at a center frequency point at the receiver in the first node, thus benefiting the performance of the receiver in HST-SFN scenarios.

In one embodiment, an advantage of the above method includes: the first node determines a reception frequency according to the first reference signal, where the reception frequency is unrelated to any other reference signal of the Q1 reference signals other than the first reference signal, so that the receiver needs not process received signals with varying center frequencies that come from different TRPs, hence the reduction of complexity of the receiver.

According to one aspect of the present application, the above method is characterized in that when the first time length is smaller than the first time threshold, the first reference signal is a reference signal determined by a transmission configuration parameter with a lowest index among the Q1 transmission configuration parameters.

In one embodiment, characteristics of the above method include: the first time threshold being a minimum time interval since the first node receives the second information block till a time when the first node can apply the transmission configuration parameter comprised in the second information block.

In one embodiment, characteristics of the above method include: the first time threshold being a minimum time interval since the first node receives the second information block till a time when the first node can apply the first-type relationship indicated by the transmission configuration parameter comprised in the second information block.

In one embodiment, an advantage of the above method includes: when the first time length is not sufficient enough for applying the transmission configuration parameter comprised in the second information block, a reference signal determined by a transmission configuration parameter with a lowest index among the Q1 transmission configuration parameters is selected according to a default rule for determining a reception frequency, thus avoiding the case in which the reception frequency cannot be determined.

According to one aspect of the present application, the above method is characterized in comprising:

receiving a second radio signal, the second radio signal beginning to be transmitted before a start time of the first time-frequency resource set.

Herein, Q2 transmission configuration parameters are used together for receiving the second radio signal, Q2 being a positive integer greater than 1; the Q2 transmission configuration parameters are respectively used to determine Q2 reference signals, with a second reference signal being one of the Q2 reference signals; there is the first-type relationship between the second radio signal and the second reference signal; when the first time length is smaller than the first time threshold, an index of a transmission configuration parameter associated with the second reference signal among the Q2 transmission configuration parameters is used to determine the first reference signal out of the Q1 reference signals.

In one embodiment, characteristics of the above method include: the second radio signal being a latest radio signal before a first radio signal that is transmitted by means of an SFN.

In one embodiment, an advantage of the above method includes: when the first time length is not sufficient enough for applying the transmission configuration parameter comprised in the second information block, the first node determines a first reference signal according to a number of a reference signal used for determining the reception frequency that is used by a latest radio signal transmitted by means of SFN before the first radio signal, which can reflect the latest channel status, and, thanks to continued use of the configuration of a second radio signal, can avoid reconfiguration of the reception frequency, thus making the hardcore less demanding.

According to one aspect of the present application, the above method is characterized in that the second information block comprises first indication information; when the first time length is no smaller than the first time threshold, the first indication information is used to determine the first reference signal out of the Q1 reference signals.

In one embodiment, characteristics of the above method include: when the first time length is sufficient enough for applying the transmission configuration parameter comprised in the second information block, the first reference signal is indicated by first indication information comprised in the second information block.

In one embodiment, an advantage of the above method includes: by indicating the first reference signal from the Q1 reference signals using a dynamic signaling, the network equipment can select any reference signal randomly from the Q1 reference signals as a first reference signal based on the current channel properties, which not only increases the degree of scheduling freedom of the network equipment but also contributes to the enhancement of system performance.

According to one aspect of the present application, the above method is characterized in that the first-type relationship comprises a Doppler Shift Quasi Co-location relationship; the second-type relationship does not comprise a Doppler Shift Quasi Co-location relationship.

According to one aspect of the present application, the above method is characterized in that the first information block is used to determine Q3 transmission configuration parameter groups, and any of the Q3 transmission configuration parameter groups comprises Q4 transmission configuration parameter(s), where Q3 is a positive integer greater than 1, and Q4 is a positive integer; when the first time length is smaller than the first time threshold, the first transmission configuration parameter group is a transmission configuration parameter group with a lowest index among the Q3 transmission configuration parameter groups that comprises the Q1 transmission configuration parameters.

According to one aspect of the present application, the above method is characterized in that the first reference signal is used to determine a reception frequency of receiving the first radio signal, and each reference signal of the Q1 reference signals other than the first reference signal is not used to determine the reception frequency of receiving the first radio signal.

The present application provides a method in a second node for wireless communications, comprising:

transmitting a first information block and a second information block; and transmitting a first radio signal in a first time-frequency resource set, the second information block being used to indicate the first time-frequency resource set;

herein, the first information block is used to determine a first transmission configuration parameter group, the first transmission configuration parameter group comprising Q1 transmission configuration parameters, where the Q1 transmission configuration parameters are used together for receiving the first radio signal, Q1 being a positive integer greater than 1; the Q1 transmission configuration parameters are respectively used to determine Q1 reference signals, with a first reference signal being one of the Q1 reference signals; there is a first-type relationship between the first radio signal and the first reference signal, and there is a second-type relationship between the first radio signal and one of the Q1 reference signals other than the first reference signal, where the first-type relationship and the second-type relationship are different; a time interval between a time for receiving the second information block and a time for receiving the first time-frequency resource set is equal to a first time length, and a relative magnitude of the first time length and a first time threshold is used to determine the first reference signal out of the Q1 reference signals; the first time threshold comprises a time length of a positive integer number of multicarrier symbol(s).

According to one aspect of the present application, the above method is characterized in that when the first time length is smaller than the first time threshold, the first reference signal is a reference signal determined by a transmission configuration parameter with a lowest index among the Q1 transmission configuration parameters.

According to one aspect of the present application, the above method is characterized in comprising:

transmitting a second radio signal, the second radio signal beginning to be transmitted before a start time of the first time-frequency resource set.

Herein, Q2 transmission configuration parameters are used together for receiving the second radio signal, Q2 being a positive integer greater than 1; the Q2 transmission configuration parameters are respectively used to determine Q2 reference signals, with a second reference signal being one of the Q2 reference signals; there is the first-type relationship between the second radio signal and the second reference signal; when the first time length is smaller than the first time threshold, an index of a transmission configuration parameter associated with the second reference signal among the Q2 transmission configuration parameters is used to determine the first reference signal out of the Q1 reference signals.

According to one aspect of the present application, the above method is characterized in that the second information block comprises first indication information; when the first time length is no smaller than the first time threshold, the first indication information is used to determine the first reference signal out of the Q1 reference signals.

According to one aspect of the present application, the above method is characterized in that the first-type relationship comprises a Doppler Shift Quasi Co-location relationship; the second-type relationship does not comprise a Doppler Shift Quasi Co-location relationship.

According to one aspect of the present application, the above method is characterized in that the first information block is used to determine Q3 transmission configuration parameter groups, and any of the Q3 transmission configuration parameter groups comprises Q4 transmission configuration parameter(s), where Q3 is a positive integer greater than 1, and Q4 is a positive integer; when the first time length is smaller than the first time threshold, the first transmission configuration parameter group is a transmission configuration parameter group with a lowest index among the Q3 transmission configuration parameter groups that comprises the Q1 transmission configuration parameters.

According to one aspect of the present application, the above method is characterized in that the first reference signal is used to determine a reception frequency of receiving the first radio signal, and each reference signal of the Q1 reference signals other than the first reference signal is not used to determine the reception frequency of receiving the first radio signal.

The present application provides a first node for wireless communications, comprising:

a first receiver, receiving a first information block and a second information block;

the first receiver, receiving a first radio signal in a first time-frequency resource set, the second information block being used to indicate the first time-frequency resource set;

herein, the first information block is used to determine a first transmission configuration parameter group, the first transmission configuration parameter group comprising Q1 transmission configuration parameters, where the Q1 transmission configuration parameters are used together for receiving the first radio signal, Q1 being a positive integer greater than 1; the Q1 transmission configuration parameters are respectively used to determine Q1 reference signals, with a first reference signal being one of the Q1 reference signals; there is a first-type relationship between the first radio signal and the first reference signal, and there is a second-type relationship between the first radio signal and one of the Q1 reference signals other than the first reference signal, where the first-type relationship and the second-type relationship are different; a time interval between a time for receiving the second information block and a time for receiving the first time-frequency resource set is equal to a first time length, and a relative magnitude of the first time length and a first time threshold is used to determine the first reference signal out of the Q1 reference signals; the first time threshold comprises a time length of a positive integer number of multicarrier symbol(s).

The present application provides a second node for wireless communications, comprising:

a first transmitter, transmitting a first information block and a second information block;

the first transmitter, transmitting a first radio signal in a first time-frequency resource set, the second information block being used to indicate the first time-frequency resource set;

herein, the first information block is used to determine a first transmission configuration parameter group, the first transmission configuration parameter group comprising Q1 transmission configuration parameters, where the Q1 transmission configuration parameters are used together for receiving the first radio signal, Q1 being a positive integer greater than 1; the Q1 transmission configuration parameters are respectively used to determine Q1 reference signals, with a first reference signal being one of the Q1 reference signals; there is a first-type relationship between the first radio signal and the first reference signal, and there is a second-type relationship between the first radio signal and one of the Q1 reference signals other than the first reference signal, where the first-type relationship and the second-type relationship are different; a time interval between a time for receiving the second information block and a time for receiving the first time-frequency resource set is equal to a first time length, and a relative magnitude of the first time length and a first time threshold is used to determine the first reference signal out of the Q1 reference signals; the first time threshold comprises a time length of a positive integer number of multicarrier symbol(s).

The present application provides a method in a first node for wireless communications, comprising:

receiving a first information block; and receiving Q1 first-type signals respectively in Q1 first-type time-frequency resource sets, where Q1 is a positive integer greater than 1, the first information block being used to determine the Q1 first-type time-frequency resource sets;

herein, a first data block is used for generating the Q1 first-type signals; the first information block is used to determine Q2 transmission configuration parameters, the Q2 transmission configuration parameters being used together for receiving the Q1 first-type signals, Q2 being a positive integer greater than 1; the Q2 transmission configuration parameters are respectively used to determine Q2 first-type reference signals; a first signal is one of the Q1 first-type signals; a first reference signal is one of the Q2 first-type reference signals; there is a first-type relationship between the first signal and the first reference signal, the first-type relationship being a candidate relationship among Q3 candidate relationships, where Q3 is a positive integer greater than 1; a position of the first signal in the Q1 first-type signals is used to determine the first reference signal out of the Q2 first-type reference signals.

In one embodiment, characteristics of the above method include: the Q1 first-type signals are Q1 repetitions of the first data block.

In one embodiment, characteristics of the above method include: the Q1 first-type signals are Q1 transmissions indicated by the first information block.

In one embodiment, characteristics of the above method include: any of the Q1 first-type signals is transmitted by means of SFN by Q2 TRPs, and the Q2 transmission configuration parameters are respectively used by the Q2 TRPs for transmitting the any first-type signal among the Q1 first-type signals; the Q2 reference signals are respectively Tracking Reference Signals (TRS) respectively transmitted by the Q2 TRPs; the first-type relationship comprises a Doppler Shift Quasi Co-location relationship.

In one embodiment, characteristics of the above method include: a TRP transmitting the first reference signal is not performed with Doppler Shift pre-compensation when transmitting the first signal, and a TRP transmitting any of the Q2 reference signals other than the first reference signal is performed with Doppler Shift pre-compensation when transmitting the first signal, where the purpose of the Doppler Shift pre-compensation is to enable a same central frequency being shared by Q2 said first signals respectively transmitted by the Q2 TRPs at a receiver in the first node.

In one embodiment, characteristics of the above method include: the first reference signal being used to determine a reception frequency of the first signal, while any reference signal among the Q1 reference signals other than the first reference signal being not used to determine a reception frequency.

In one embodiment, characteristics of the above method include: the Q2 transmission configuration parameters are respectively associated with Q2 transmitting beams.

In one embodiment, characteristics of the above method include: the Q2 transmission configuration parameters are respectively associated with Q2 transmitting beams of a TRP.

In one embodiment, characteristics of the above method include: the Q2 transmission configuration parameters are respectively associated with Q2 TRPs.

In one embodiment, characteristics of the above method include: the Q2 transmission configuration parameters are respectively associated with transmitting beams of Q2 TRPs.

In one embodiment, an advantage of the above method includes: when the first signal is transmitted by means of SFN by Q2 TRPs, one of the Q2 TRPs is used as an anchor for the reception frequency and is not performed with Doppler Shift pre-compensation when transmitting a first signal, and the other TRPs are performed with Doppler Shift pre-compensation for respectively transmitted first signals according to respectively associated Doppler Shifts, which enables Q2 said first signals respectively transmitted by the Q2 TRPs to be aligned at a center frequency point at the receiver in the first node, thus benefiting the performance of the receiver in HST-SFN scenarios.

In one embodiment, an advantage of the above method includes: the first node determines a reception frequency according to the first reference signal, where the reception frequency is unrelated to any other reference signal of the Q2 reference signals other than the first reference signal, so that the receiver needs not process received signals with varying center frequencies that come from different TRPs, hence the reduction of complexity of the receiver.

In one embodiment, an advantage of the above method includes: For two first-type signals with different positions among the Q1 first-type signals, since their positions are separate in the Q1 first-type signals, the signals are respectively linked with different reference signals with the first-type relationship, so that the channel properties of the two signals are varied, hence diversity gains can be gained.

In one embodiment, an advantage of the above method includes: For two first-type signals with different positions among the Q1 first-type signals, since their positions are separate in the Q1 first-type signals, the signals are respectively linked with different reference signals with the first-type relationship, which means that they will be performed with different operations of Doppler Shift pre-compensation; since there exists some error in the Doppler Shift pre-compensation, the above practice can help avoid constant occurrences of the same error, thus enhancing the receiver's performance.

According to one aspect of the present application, the above method is characterized in that a second-type relationship is a candidate relationship among the Q3 candidate relationships, the second-type relationship being different from the first-type relationship.

According to one aspect of the present application, the above method is characterized in that a second reference signal is a first-type reference signal among the Q2 first-type reference signals, where there is a second-type relationship between the first signal and the second reference signal.

According to one aspect of the present application, the above method is characterized in that the first information block is used to determine the first reference signal and the second reference signal out of the Q2 first-type reference signals.

According to one aspect of the present application, the above method is characterized in that there is a second-type relationship between the first signal and any first-type reference signal among the Q2 first-type reference signals other than the first reference signal.

According to one aspect of the present application, the above method is characterized in that the first-type relationship comprises a first-type quasi co-location relationship, the first-type quasi co-location relationship comprising a Doppler Shift Quasi Co-location relationship; the second-type relationship comprises a second-type quasi co-location relationship, the second-type quasi co-location relationship not comprising a Doppler Shift Quasi Co-location relationship.

According to one aspect of the present application, the above method is characterized in that the first reference signal is used to determine a frequency of the first signal, while the second reference signal is not used to determine a frequency of the first signal.

The present application provides a method in a second node for wireless communications, comprising:

transmitting a first information block; and transmitting Q1 first-type signals respectively in Q1 first-type time-frequency resource sets, where Q1 is a positive integer greater than 1, the first information block being used to determine the Q1 first-type time-frequency resource sets;

herein, a first data block is used for generating the Q1 first-type signals; the first information block is used to determine Q2 transmission configuration parameters, the Q2 transmission configuration parameters being used together for receiving the Q1 first-type signals, Q2 being a positive integer greater than 1; the Q2 transmission configuration parameters are respectively used to determine Q2 first-type reference signals; a first signal is one of the Q1 first-type signals; a first reference signal is one of the Q2 first-type reference signals; there is a first-type relationship between the first signal and the first reference signal, the first-type relationship being a candidate relationship among Q3 candidate relationships, where Q3 is a positive integer greater than 1; a position of the first signal in the Q1 first-type signals is used to determine the first reference signal out of the Q2 first-type reference signals.

According to one aspect of the present application, the above method is characterized in that a second-type relationship is a candidate relationship among the Q3 candidate relationships, the second-type relationship being different from the first-type relationship.

According to one aspect of the present application, the above method is characterized in that a second reference signal is a first-type reference signal among the Q2 first-type reference signals, where there is a second-type relationship between the first signal and the second reference signal.

According to one aspect of the present application, the above method is characterized in that the first information block is used to determine the first reference signal and the second reference signal out of the Q2 first-type reference signals.

According to one aspect of the present application, the above method is characterized in that there is a second-type relationship between the first signal and any first-type reference signal among the Q2 first-type reference signals other than the first reference signal.

According to one aspect of the present application, the above method is characterized in that the first-type relationship comprises a first-type quasi co-location relationship, the first-type quasi co-location relationship comprising a Doppler Shift Quasi Co-location relationship; the second-type relationship comprises a second-type quasi co-location relationship, the second-type quasi co-location relationship not comprising a Doppler Shift Quasi Co-location relationship.

According to one aspect of the present application, the above method is characterized in that the first reference signal is used to determine a frequency of the first signal, while the second reference signal is not used to determine a frequency of the first signal.

The present application provides a first node for wireless communications, comprising:

a first receiver, receiving a first information block;

the first receiver, receiving Q1 first-type signals respectively in Q1 first-type time-frequency resource sets, where Q1 is a positive integer greater than 1, the first information block being used to determine the Q1 first-type time-frequency resource sets;

herein, a first data block is used for generating the Q1 first-type signals; the first information block is used to determine Q2 transmission configuration parameters, the Q2 transmission configuration parameters being used together for receiving the Q1 first-type signals, Q2 being a positive integer greater than 1; the Q2 transmission configuration parameters are respectively used to determine Q2 first-type reference signals; a first signal is one of the Q1 first-type signals; a first reference signal is one of the Q2 first-type reference signals; there is a first-type relationship between the first signal and the first reference signal, the first-type relationship being a candidate relationship among Q3 candidate relationships, where Q3 is a positive integer greater than 1; a position of the first signal in the Q1 first-type signals is used to determine the first reference signal out of the Q2 first-type reference signals.

The present application provides a second node for wireless communications, comprising:

a first transmitter, transmitting a first information block;

the first transmitter, transmitting Q1 first-type signals respectively in Q1 first-type time-frequency resource sets, where Q1 is a positive integer greater than 1, the first information block being used to determine the Q1 first-type time-frequency resource sets;

herein, a first data block is used for generating the Q1 first-type signals; the first information block is used to determine Q2 transmission configuration parameters, the Q2 transmission configuration parameters being used together for receiving the Q1 first-type signals, Q2 being a positive integer greater than 1; the Q2 transmission configuration parameters are respectively used to determine Q2 first-type reference signals; a first signal is one of the Q1 first-type signals; a first reference signal is one of the Q2 first-type reference signals; there is a first-type relationship between the first signal and the first reference signal, the first-type relationship being a candidate relationship among Q3 candidate relationships, where Q3 is a positive integer greater than 1; a position of the first signal in the Q1 first-type signals is used to determine the first reference signal out of the Q2 first-type reference signals.

In one embodiment, the present application has the following advantages:

when adopting the method of SFN to transmit radio signals to the UE from multiple TRPs, selecting a TRP from the multiple TRPs as an anchor for reception frequency is supported in a dynamic manner, while radio signals transmitted from the other TRPs are performed with Doppler pre-compensation, which enables the radio signals transmitted by the multiple TRPs to be aligned with a same frequency at the UE's receiver, which is a good offset against Doppler Shift and enhances the receiver's performance;

when a time interval between a PDSCH using the method of SFN and a PDCCH that schedules the PDSCH is not sufficient enough for enabling the UE to apply a transmission configuration parameter indicated by the PDCCH, the UE adopts the default rule to select a TRS associated with a transmission configuration parameter with a minimum number among multiple transmission configuration parameters comprised in a transmission configuration parameter group for determining a reception frequency, thus avoiding the uncertainty of reception frequency caused by processing delay;

when a time interval between a PDSCH using the method of SFN and a PDCCH that schedules the PDSCH is not sufficient enough for enabling the UE to apply a transmission configuration parameter indicated by the PDCCH, the UE selects a TRS from TRSs of multiple TRPs according to a latest PDSCH configuration based on SFN transmission for determining a reception frequency, since the changes to the channel is continuous, the current status of the channel can be better reflected;

when a time interval between a PDSCH using the method of SFN and a PDCCH that schedules the PDSCH is sufficient enough for enabling the UE to apply a transmission configuration parameter indicated by the PDCCH, the UE selects a TRS from TRSs of multiple TRPs according to indication of a dynamic signaling for determining a reception frequency, which can enhance the scheduling flexibility of the base station and the system performance;

when adopting the method of SFN to transmit radio signals to the UE from multiple TRPs, selecting a TRP from the multiple TRPs as an anchor for reception frequency is supported in a dynamic manner, while radio signals transmitted from the other TRPs are performed with Doppler Shift pre-compensation, which enables the radio signals transmitted by the multiple TRPs to be aligned with a same frequency at the UE's receiver, which is a good offset against Doppler Shift and enhances the receiver's performance;

for multiple first-type signals with different positions among Q1 consecutive first-type signals, reference signals that have Doppler Shift QCL relations with the multiple first-type signals are determined according to their respective positions in the Q1 first-type signals, thus avoiding the uncertainty of the reception frequency;

for multiple first-type signals with different positions among Q1 consecutive first-type signals, they have Doppler Shift QCL relationships respectively with different reference signals, so their channels are different too, hence the benefit of obtaining diversity gains;

for multiple first-type signals with different positions among Q1 consecutive first-type signals, they have Doppler Shift QCL relationships respectively with different reference signals, so that errors of Doppler Shift pre-compensation are varied, which helps prevent the same error from occurring constantly, hence an enhancement in the receiver's performance.

BRIEF DESCRIPTION OF THE DRAWINGS

Other features, objects and advantages of the present application will become more apparent from the detailed description of non-restrictive embodiments taken in conjunction with the following drawings:

FIG. 1A illustrates a flowchart of processing of a first node according to one embodiment of the present application.

FIG. 1B illustrates a flowchart of processing of a first node according to one embodiment of the present application.

FIG. 2 illustrates a schematic diagram of a network architecture according to one embodiment of the present application.

FIG. 8 illustrates a schematic diagram of Doppler Shift pre-compensation in SFN scenario according to one embodiment of the present application.

FIG. 9A illustrates a schematic diagram of a temporal relationship between a second information block and a first radio signal according to one embodiment of the present application.

FIG. 9B illustrates a schematic diagram of reception frequencies of a first reference signal, a second reference signal and a first signal according to one embodiment of the present application.

FIG. 10A illustrates a schematic diagram of temporal relationships between a second radio signal, a second information block and a first radio signal according to one embodiment of the present application.

FIG. 10B illustrates a schematic diagram of the Q1 first-type time-frequency resource sets respectively occupied by the Q1 first-type signals according to one embodiment of the present application.

FIG. 11 illustrates a schematic diagram of multiple transmission configuration parameter groups and transmission configuration parameters respectively comprised in the multiple transmission configuration parameter groups according to one embodiment of the present application.

FIG. 12A illustrates a structure block diagram of a processing device used in a first node.

FIG. 12B illustrates a schematic diagram of time-domain resources respectively occupied by four first-type signals and reference signals that have first-type relationship respectively with the four first-type signals according to one embodiment of the present application.

FIG. 13A illustrates a structure block diagram of a processing device used in a second node.

FIG. 13B illustrates a schematic diagram of time-domain resources respectively occupied by four first-type signals and reference signals that have first-type relationship respectively with the four first-type signals according to one embodiment of the present application.

FIG. 14 illustrates a structure block diagram of a processing device used in a first node.

FIG. 15 illustrates a structure block diagram of a processing device used in a second node.

DESCRIPTION OF THE EMBODIMENTS

Figure 3:
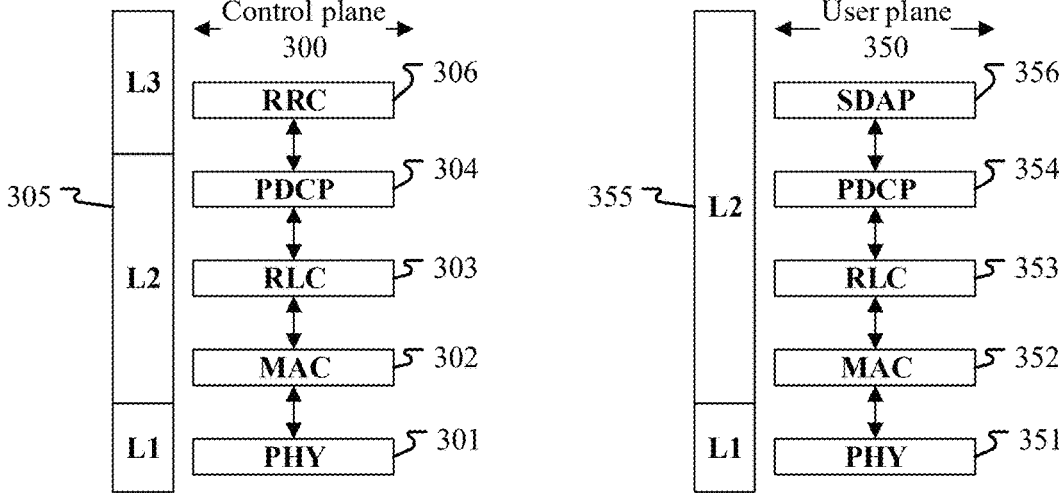
FIG. 3 illustrates a schematic diagram of a radio protocol architecture of a user plane and a control plane according to one embodiment of the present application.

The technical scheme of the present application is described below in further details in conjunction with the drawings. It should be noted that the embodiments of the present application and the characteristics of the embodiments may be arbitrarily combined if no conflict is caused.

Embodiment 1A

Embodiment 1A illustrates a flowchart of processing of a first node according to one embodiment of the present application, as shown in FIG. 1A. In FIG. 1A, each box represents a step. Particularly, the sequential step arrangement in each box herein does not imply a chronological order of steps marked respectively by these boxes. In Embodiment 1A, the first node in the present application receives a first information block and a second information block in step 101A, and receives a first radio signal in a first time-frequency resource set in step 102A; herein, the second information block is used to indicate the first time-frequency resource set, and the first information block is used to determine a first transmission configuration parameter group, the first transmission configuration parameter group comprising Q1 transmission configuration parameters, where the Q1 transmission configuration parameters are used together for receiving the first radio signal, Q1 being a positive integer greater than 1; the Q1 transmission configuration parameters are respectively used to determine Q1 reference signals, with a first reference signal being one of the Q1 reference signals; there is a first-type relationship between the first radio signal and the first reference signal, and there is a second-type relationship between the first radio signal and one of the Q1 reference signals other than the first reference signal, where the first-type relationship and the second-type relationship are different; a time interval between a time for receiving the second information block and a time for receiving the first time-frequency resource set is equal to a first time length, and a relative magnitude of the first time length and a first time threshold is used to determine the first reference signal out of the Q1 reference signals; the first time threshold comprises a time length of a positive integer number of multicarrier symbol(s).

In one embodiment, the first radio signal comprises a baseband signal.

In one embodiment, the first radio signal comprises a radio signal.

In one embodiment, the first radio signal is transmitted in the sidelink.

In one embodiment, the first radio signal is transmitted in the UpLink.

In one embodiment, the first radio signal is transmitted in the DownLink.

In one embodiment, the first radio signal is transmitted in the Backhaul link.

In one embodiment, the first radio signal is transmitted via a Uu interface.

In one embodiment, the first radio signal is transmitted via a PC5 interface.

In one embodiment, the first radio signal carries a Transport Block (TB).

In one embodiment, the first radio signal carries a Code Block (CB).

In one embodiment, the first radio signal carries a Code Block Group (CBG).

In one embodiment, the first radio signal comprises control information.

In one embodiment, the first radio signal comprises Sidelink Control Information (SCI).

In one embodiment, the first radio signal comprises one or more fields in an SCI.

In one embodiment, the first radio signal comprises one or more fields in an SCI format.

In one embodiment, the first radio signal comprises Uplink control information (UCI).

In one embodiment, the first radio signal comprises one or more fields in a UCI.

In one embodiment, the first radio signal comprises one or more fields in a UCI format.

In one embodiment, the first radio signal comprises Downlink Control Information (DCI).

In one embodiment, the first radio signal comprises one or more fields in a DCI.

In one embodiment, the first radio signal comprises one or more fields in a DCI format.

In one embodiment, the first radio signal comprises a Physical Uplink Shared Channel (PUSCH).

In one embodiment, the first radio signal comprises a Physical Uplink Control Channel (PUCCH).

In one embodiment, the first radio signal comprises a Physical Downlink Shared Channel (PDSCH).

In one embodiment, the first radio signal comprises a Physical Downlink Control Channel (PDCCH).

In one embodiment, the first radio signal comprises a Physical Sidelink Control Channel (PSCCH).

In one embodiment, the first radio signal comprises a Physical Sidelink Shared Channel (PSSCH).

In one embodiment, the first radio signal comprises a Physical Sidelink Feedback Channel (PSFCH).

In one embodiment, the first radio signal is transmitted in Licensed Spectrum.

In one embodiment, the first radio signal is transmitted in Unlicensed Spectrum.

In one embodiment, the first radio signal comprises a reference signal.

In one embodiment, the first radio signal comprises an uplink reference signal.

In one embodiment, the first radio signal comprises a downlink reference signal.

In one embodiment, the first radio signal comprises a sidelink reference signal.

In one embodiment, the first radio signal comprises a Demodulation Reference Signal (DMRS).

In one embodiment, the first radio signal comprises a Channel State Information Reference Signal (CSI-RS).

In one embodiment, the first radio signal comprises a Phase Tracking Reference Signal (PTRS).

In one embodiment, the first radio signal comprises a Tracking Reference Signal (TRS).

In one embodiment, the first radio signal comprises a Positioning Reference Signal (PRS).

In one embodiment, the first radio signal comprises a Sounding Reference Signal (SRS).

In one embodiment, the first radio signal comprises a Configured Grant uplink signal.

In one embodiment, the first radio signal comprises a dynamically scheduled uplink signal.

In one embodiment, the first radio signal comprises a semi-persistently scheduled uplink signal.

In one embodiment, the first radio signal comprises a Configured Grant PUSCH (CG-PUSCH).

In one embodiment, the first radio signal comprises a dynamically scheduled PUSCH.

In one embodiment, the first radio signal comprises a semi-persistently scheduled PUSCH.

In one embodiment, the first radio signal comprises a Group Common PDCCH.

In one embodiment, the first radio signal is transmitted by means of SFN.

In one embodiment, the first radio signal is transmitted by Q1 TRPs.

In one embodiment, the first radio signal is transmitted by Q1 TRPs in the first time-frequency resource set.

In one embodiment, the first radio signal is transmitted by Q1 transmitting beams in the first time-frequency resource set.

In one embodiment, the first radio signal is transmitted by the Q1 transmission configuration parameters in the first time-frequency resource set.

In one embodiment, the first radio signals respectively transmitted by the Q1 TRPs are identical.

In one embodiment, the first radio signals respectively transmitted by the Q1 transmission configuration parameters are identical.

In one embodiment, the first radio signal comprises a first Transport Block (TB) and a first-type reference signal; the first TBs respectively comprised in the first radio signals respectively transmitted by any two transmission configuration parameters among the Q1 transmission configuration parameters are identical, while the first-type reference signals respectively comprised in the first radio signals respectively transmitted by any two transmission configuration parameters among the Q1 transmission configuration parameters are different.

In one subembodiment, the first-type reference signals respectively comprised in the first radio signals respectively transmitted by any two transmission configuration parameters among the Q1 transmission configuration parameters are orthogonal.

In one subembodiment, the first TB comprises a PDSCH.

In one subembodiment, the first TB comprises a PDCCH.

In one subembodiment, the first TB comprises a PUSCH.

In one subembodiment, the first TB comprises a PUCCH.

In one subembodiment, the first TB comprises a PSCCH.

In one subembodiment, the first TB comprises a PSSCH.

In one subembodiment, the first-type reference signal comprises a DMRS.

In one subembodiment, the first-type reference signal comprises a CSI-RS.

In one subembodiment, the first-type reference signal comprises a TRS.

In one subembodiment, the first-type reference signal comprises a PTRS.

In one embodiment, any one of the Q1 transmission configuration parameters comprises a spatial domain filter.

In one embodiment, any one of the Q1 transmission configuration parameters comprises a transmission configuration indicator (TCI).

In one embodiment, any one of the Q1 transmission configuration parameters comprises a TCI state.

In one embodiment, any one of the Q1 transmission configuration parameters comprises a TCI Codepoint.

In one embodiment, the first transmission configuration parameter group comprises TCI Codepoints.

In one embodiment, any one of the Q1 transmission configuration parameters comprises a Spatial Relation parameter.

In one embodiment, any one of the Q1 transmission configuration parameters comprises a Quasi-Co-Location parameter.

In one embodiment, any one of the Q1 transmission configuration parameters is used to determine a transmitting beam.

In one embodiment, any one of the Q1 transmission configuration parameters is used to determine a receiving beam.

In one embodiment, any one of the Q1 transmission configuration parameters is used to determine a spatial transmission filter.

In one embodiment, any one of the Q1 transmission configuration parameters is used to determine a spatial receive filter.

In one embodiment, any one of the Q1 transmission configuration parameters is used to determine a Spatial Relation with a reference signal.

In one embodiment, any one of the Q1 transmission configuration parameters is used to determine a QCL relation with a reference signal.

In one subembodiment, the reference signal comprises one of an SSB, a CSI-RS, a TRS, an SRS, a PTRS, or a DMRS.

In one embodiment, the QCL parameter comprises a QCL type.

In one embodiment, the QCL parameter comprises a QCL-linked relation with another signal.

In one embodiment, the QCL parameter comprises a Spatial Relation with another signal.

In one embodiment, the specific definition of the QCL can be found in 3GPP TS38.214, section 5.1.5.

In one embodiment, a QCL-linked relation between one signal and another means that all or part of large-scale properties of a radio signal transmitted on an antenna port corresponding to the signal can be used to infer all or part of large-scale properties of a radio signal transmitted on an antenna port corresponding to the other signal.

In one embodiment, the large-scale properties of a radio signal comprise one or more of {delay spread, Doppler spread, Doppler shift, path loss, average gain, average delay, Spatial Rx parameters}.

In one embodiment, the Spatial Rx parameters comprise one or more of {receiving beam, receiving analog beamforming matrix, receiving analog beamforming vector, receiving beamforming vector, receiving spatial filter, spatial domain reception filter}.

In one embodiment, a QCL-linked relation between one signal and another means that there is at least one same QCL parameter shared by the signal and the other signal.

In one embodiment, the QCL parameter(s) comprises/comprise one or more of {delay spread, Doppler spread, Doppler shift, path loss, average gain, average delay, Spatial Rx parameters}.

In one embodiment, a QCL-linked relation between one signal and another means that at least one QCL parameter of the other signal can be inferred from at least one QCL parameter of the signal.

In one embodiment, a QCL type between one signal and another being QCL-TypeD means that Spatial Rx parameters of a radio signal transmitted on an antenna port corresponding to the other signal can be inferred from Spatial Rx parameters of a radio signal transmitted on an antenna port corresponding to the signal.

In one embodiment, a QCL type between one signal and another being QCL-TypeA means that {delay spread, Doppler spread, Doppler shift, average delay} of a radio signal transmitted on an antenna port corresponding to the other signal can be inferred from {delay spread, Doppler spread, Doppler shift, average delay} of a radio signal transmitted on an antenna port corresponding to the signal.

In one embodiment, a QCL type between one signal and another being QCL-TypeE means that {delay spread, average delay} of a radio signal transmitted on an antenna port corresponding to the other signal can be inferred from {delay spread, average delay} of a radio signal transmitted on an antenna port corresponding to the signal.

In one embodiment, a QCL type between one signal and another being QCL-TypeD means that the same Spatial Rx parameters can be used to receive the reference signal and the other reference signal.

In one embodiment, a Spatial Relation between one signal and the other signal means: transmitting the other signal with a spatial filter that receives the signal.

In one embodiment, a Spatial Relation between one signal and the other signal means: receiving the other signal with a spatial filter that transmits the signal.

In one embodiment, the Q1 transmission configuration parameters are respectively used by Q1 TRPs for transmitting the first radio signal.

In one embodiment, the first-type relationship includes QCL Relation.

In one embodiment, the first-type relationship includes QCL TypeA.

In one embodiment, the first-type relationship includes a first-type QCL relation, where large-scale properties comprised in the first-type QCL relation include Doppler Shift.

In one embodiment, the first-type relationship includes a first-type QCL relation, where large-scale properties comprised in the first-type QCL relation include Doppler Spread.

In one embodiment, the sentence that "there is a first-type relationship between the first radio signal and the first reference signal" comprises that the first reference signal is used to determine a reception frequency of the first radio signal.

In one embodiment, the sentence that "there is a first-type relationship between the first radio signal and the first reference signal" comprises that the first reference signal is used to determine a transmission frequency of the first radio signal.

In one embodiment, the sentence that "there is a first-type relationship between the first radio signal and the first reference signal" comprises that the first reference signal is used to determine a Doppler shift of the first radio signal.

In one embodiment, the sentence that "there is a first-type relationship between the first radio signal and the first reference signal" comprises that the first reference signal is used to determine a Doppler spread of the first radio signal.

In one embodiment, the sentence that "there is a first-type relationship between the first radio signal and the first reference signal" comprises that the first reference signal and the first radio signal have an identical reception frequency.

In one embodiment, the sentence that "there is a first-type relationship between the first radio signal and the first reference signal" comprises that the first reference signal and the first radio signal have an identical transmission frequency.

In one embodiment, the sentence that "there is a first-type relationship between the first radio signal and the first reference signal" comprises that the first reference signal and the first radio signal have an identical Doppler shift.

In one embodiment, the sentence that "there is a first-type relationship between the first radio signal and the first reference signal" comprises that the first reference signal and the first radio signal have an identical Doppler spread.

In one embodiment, the sentence that "there is a first-type relationship between the first radio signal and the first reference signal" comprises that an offset between the reception frequency of the first reference signal and the reception frequency of the first radio signal is F1 Hz, where F1 is a real number.

In one subembodiment, the F1 is indicated to the first node by the second node.

In one subembodiment, the F1 is determined by the first node itself.

In one embodiment, the sentence that "there is a first-type relationship between the first radio signal and the first reference signal" comprises that an offset between the transmission frequency of the first reference signal and the transmission frequency of the first radio signal is F2 Hz, where F2 is a real number.

In one subembodiment, the F2 is indicated to the first node by the second node.

In one subembodiment, the F2 is determined by the first node itself.

In one embodiment, the second-type relationship includes QCL Relation.

In one embodiment, the second-type relationship includes QCL TypeE.

In one embodiment, the second-type relationship includes a second-type QCL relation, where large-scale properties of the second-type QCL relation do not include Doppler shift.

In one embodiment, the second-type relationship includes a second-type QCL relation, where large-scale properties of the second-type QCL relation do not include Doppler spread.

In one embodiment, the sentence that "there is a second-type relationship between the first radio signal and one of the Q1 reference signals other than the first reference signal" comprises that the reference signal of the Q1 reference signals other than the first reference signal is not used to determine a reception frequency of the first radio signal.

In one embodiment, the sentence that "there is a second-type relationship between the first radio signal and one of the Q1 reference signals other than the first reference signal" comprises that the reference signal of the Q1 reference signals other than the first reference signal is not used to determine a transmission frequency of the first radio signal.

In one embodiment, the sentence that "there is a second-type relationship between the first radio signal and one of the Q1 reference signals other than the first reference signal" comprises that the reference signal of the Q1 reference signals other than the first reference signal is not used to determine a Doppler shift of the first radio signal.

In one embodiment, the sentence that "there is a second-type relationship between the first radio signal and one of the Q1 reference signals other than the first reference signal" comprises that the reference signal of the Q1 reference signals other than the first reference signal is not used to determine a Doppler spread of the first radio signal.

In one embodiment, the sentence that "there is a second-type relationship between the first radio signal and one of the Q1 reference signals other than the first reference signal" comprises that the reference signal of the Q1 reference signals other than the first reference signal and the first radio signal have different reception frequencies.

In one embodiment, the sentence that "there is a second-type relationship between the first radio signal and one of the Q1 reference signals other than the first reference signal" comprises that the reference signal of the Q1 reference signals other than the first reference signal and the first radio signal have different transmission frequencies.

In one embodiment, the sentence that "there is a second-type relationship between the first radio signal and one of the Q1 reference signals other than the first reference signal" comprises that the reference signal of the Q1 reference signals other than the first reference signal and the first radio signal have different Doppler shifts.

In one embodiment, the sentence that "there is a second-type relationship between the first radio signal and one of the Q1 reference signals other than the first reference signal" comprises that the reference signal of the Q1 reference signals other than the first reference signal and the first radio signal have different Doppler spreads.

In one embodiment, the sentence that "there is a second-type relationship between the first radio signal and one of the Q1 reference signals other than the first reference signal" comprises that the reference signal of the Q1 reference signals other than the first reference signal is used to determine a spatial reception filter of the first radio signal.

In one embodiment, the sentence that "there is a second-type relationship between the first radio signal and one of the Q1 reference signals other than the first reference signal" comprises that if QCL parameter(s) comprised in the second-type relationship includes Doppler Shift, the Doppler Shift comprised in the QCL parameter comprised in the second-type relationship is not used for receiving the first radio signal.

In one embodiment, the sentence that "there is a second-type relationship between the first radio signal and one of the Q1 reference signals other than the first reference signal" comprises that if QCL parameter(s) comprised in the second-type relationship includes Doppler Spread, the Doppler Spread comprised in the QCL parameter comprised in the second-type relationship is not used for receiving the first radio signal.

In one embodiment, the sentence that "the Q1 transmission configuration parameters are used together for receiving the first radio signal" comprises: the Q1 transmission configuration parameters are used to determine a first spatial reception filter, the first spatial reception filter being used to receive the first radio signal.

In one embodiment, the sentence that "the Q1 transmission configuration parameters are used together for receiving the first radio signal" comprises: the Q1 transmission configuration parameters are used to determine Q1 spatial reception filters, the Q1 spatial reception filters being used to receive the first radio signal.

In one embodiment, the sentence that "the Q1 transmission configuration parameters are used together for receiving the first radio signal" comprises: the first node receives the first radio signal by means of SFN using Q1 transmission configuration parameters.

In one embodiment, the sentence that "the Q1 transmission configuration parameters are used together for receiving the first radio signal" comprises: the first node receives the first radio signal in the first time-frequency resource set respectively using Q1 transmission configuration parameters.

In one subembodiment, the first radio signal is a single PDSCH.

In one subembodiment, the first radio signal is a single DMRS port.

In one subembodiment, the first radio signal is a single CSI-RS port.

In one embodiment, the first time-frequency resource set comprises a positive integer number of Resource Element(s) (RE(s)) in frequency domain.

In one embodiment, the first time-frequency resource set comprises a positive integer number of Resource Block(s) (RB(s)) in frequency domain.

In one embodiment, the first time-frequency resource set comprises a positive integer number of Resource Block Group(s) (RBG(s)) in frequency domain.

In one embodiment, the first time-frequency resource set comprises a positive integer number of Control Channel Element(s) (CCE(s)) in frequency domain.

In one embodiment, the first time-frequency resource set comprises a positive integer number of multicarrier symbol(s) in time domain.

In one embodiment, the first time-frequency resource set comprises a positive integer number of slot(s) in time domain.

In one embodiment, the first time-frequency resource set comprises a positive integer number of subframe(s) in time domain.

In one embodiment, the first time-frequency resource set comprises multiple consecutive multicarrier symbols in time domain.

In one embodiment, the first time-frequency resource set comprises multiple consecutive resource blocks in frequency domain.

In one embodiment, the first time-frequency resource set comprises multiple non-consecutive resource blocks in frequency domain.

In one embodiment, the first information block comprises Sidelink Control Information (SCI).

In one embodiment, the first information block comprises one or more fields in an SCI.

In one embodiment, the first information block comprises one or more fields in an SCI format.

In one embodiment, the first information block comprises Uplink Control Information (UCI).

In one embodiment, the first information block comprises one or more fields in a UCI.

In one embodiment, the first information block comprises one or more fields in a UCI format.

In one embodiment, the first information block comprises Downlink Control Information (DCI).

In one embodiment, the first information block comprises one or more fields in a DCI.

In one embodiment, the first information block comprises one or more fields in a DCI format.

In one embodiment, the first information block comprises a higher-layer signaling.

In one embodiment, the first information block comprises one or more fields in a higher-layer signaling.

In one embodiment, the first information block comprises one or more fields in a MAC layer signaling.

In one embodiment, the first information block comprises a MAC Control Element (MAC-CE).

In one embodiment, the first information block comprises one or more fields in an RRC signaling.

In one embodiment, the second information block comprises Sidelink Control Information (SCI).

In one embodiment, the second information block comprises one or more fields in an SCI.

In one embodiment, the second information block comprises one or more fields in an SCI format.

In one embodiment, the second information block comprises Uplink control information (UCI).

In one embodiment, the second information block comprises one or more fields in a UCI.

In one embodiment, the second information block comprises one or more fields in a UCI format.

In one embodiment, the second information block comprises Downlink Control Information (DCI).

In one embodiment, the second information block comprises one or more fields in a DCI.

In one embodiment, the second information block comprises one or more fields in a DCI format.

In one embodiment, the second information block comprises a higher-layer signaling.

In one embodiment, the second information block comprises one or more fields in a higher-layer signaling.

In one embodiment, the second information block comprises one or more fields in a MAC layer signaling.

In one embodiment, the second information block comprises a MAC Control Element (MAC-CE).

In one embodiment, the second information block comprises one or more fields in an RRC signaling.

In one embodiment, any of the Q1 reference signals comprises an SSB.

In one embodiment, any of the Q1 reference signals comprises a CSI-RS.

In one embodiment, any of the Q1 reference signals comprises an SRS.

In one embodiment, any of the Q1 reference signals comprises a DMRS.

In one embodiment, any of the Q1 reference signals comprises a TRS.

In one embodiment, any of the Q1 reference signals comprises a PTRS.

In one embodiment, any of the Q2 reference signals comprises an SSB.

In one embodiment, any of the Q2 reference signals comprises a CSI-RS.

In one embodiment, any of the Q2 reference signals comprises an SRS.

In one embodiment, any of the Q2 reference signals comprises a DMRS.

In one embodiment, any of the Q2 reference signals comprises a TRS.

In one embodiment, any of the Q2 reference signals comprises a PTRS.

Embodiment 2

Embodiment 2 illustrates a schematic diagram of a network architecture according to the present application, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present application includes the gNB203.

In one embodiment, the second node in the present application includes the gNB203.

In one embodiment, the second node in the present application includes the UE 241.

In one embodiment, the first node in the present application includes the UE 241.

In one embodiment, the second node in the present application includes the UE 201.

In one embodiment, the second node in the present application includes the gNB204.

In one embodiment, the UE in the present application includes the UE 201.

In one embodiment, the UE in the present application includes the UE 241.

In one embodiment, the base station in the present application includes the gNB203.

In one embodiment, the base station in the present application includes the gNB204.

In one embodiment, the UE 201 supports sidelink transmission.

In one embodiment, the UE 201 supports a PC5 interface.

In one embodiment, the UE 201 supports a Uu interface.

In one embodiment, the UE 241 supports sidelink transmission.

In one embodiment, the UE 241 supports a PC5 interface.

In one embodiment, the gNB203 supports a Uu interface.

Embodiment 3

Embodiment 3 illustrates a schematic diagram of an embodiment of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, or RSU in V2X, vehicle-mounted equipment or vehicle-mounted communication module) and a second node (gNB, UEUE, or RSU in V2X, vehicle-mounted equipment or vehicle-mounted communication module), or between two UEs is represented by three layers, which are a layer 1, a layer 2 and a layer 3, respectively. Layer 1, layer 2 and layer 3. The layer 1 (L1) is the lowest layer which performs signal processing functions of various PHY layers. The L1 is called PHY 301 in the present application. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. The PDCP sublayer 304 provides data encryption and integrity protection, and provides support for handover of a first node between second nodes. The RLC sublayer 303 provides segmentation and reassembling of a packet, retransmission of a lost packet via ARQ, as well as support for detections over repeated packets and protocol errors. The MAC sublayer 302 provides mapping between a logical channel and a transport channel and multiplexing of logical channels. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several upper layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first radio signal in the present application is generated by the PHY 351.

In one embodiment, the first radio signal in the present application is generated by the MAC352.

In one embodiment, the first radio signal in the present application is generated by the PHY 301.

In one embodiment, the first radio signal in the present application is generated by the MAC302.

In one embodiment, the first radio signal in the present application is generated by the RRC306.

In one embodiment, the first information block in the present application is generated by the PHY 351.

In one embodiment, the first information block in the present application is generated by the MAC 352.

In one embodiment, the first information block in the present application is generated by the PHY 301.

In one embodiment, the first information block in the present application is generated by the MAC 302.

In one embodiment, the first information block in the present application is generated by the RRC306.

In one embodiment, the second information block in the present application is generated by the PHY 351.

In one embodiment, the second information block in the present application is generated by the MAC 352.

In one embodiment, the second information block in the present application is generated by the PHY 301.

In one embodiment, the second information block in the present application is generated by the MAC 302.

In one embodiment, the second information block in the present application is generated by the RRC306.

Embodiment 4

Figure 4:
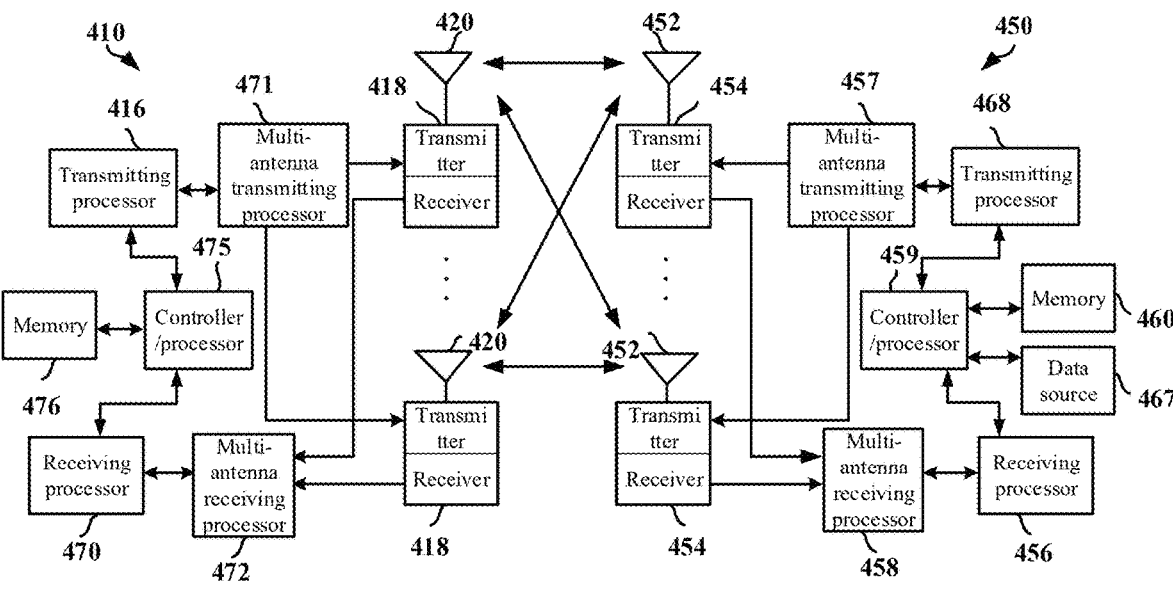
FIG. 4 illustrates a schematic diagram of a first communication device and a second communication device according to one embodiment of the present application.

Embodiment 4 illustrates a schematic diagram of a first communication device and a second communication device according to the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In the transmission from the first communication device 410 to the second communication device 450, the controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the second communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication node 410 to the second communication node 450, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present application comprises the second communication device 450, and the second node in the present application comprises the first communication device 410.

In one embodiment, the first node in the present application comprises the first communication device 410, and the second node in the present application comprises the second communication device 450.

In one embodiment, the first node in the present application comprises the second communication device 450, and the second node in the present application comprises the second communication device 450.

In one subembodiment, the second communication device 450 comprises: at least one controller/processor; the at least one controller/processor is in charge of HARQ operation.

In one subembodiment, the first communication device 410 comprises: at least one controller/processor; the at least one controller/processor is in charge of HARQ operation.

In one subembodiment, the first communication device 410 comprises: at least one controller/processor; the at least one controller/processor is in charge of error detections using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor. The second communication device 450 at least: receives a first information block and a second information block; and receives a first radio signal in a first time-frequency resource set, the second information block being used to indicate the first time-frequency resource set; herein, the first information block is used to determine a first transmission configuration parameter group, the first transmission configuration parameter group comprising Q1 transmission configuration parameters, where the Q1 transmission configuration parameters are used together for receiving the first radio signal, Q1 being a positive integer greater than 1; the Q1 transmission configuration parameters are respectively used to determine Q1 reference signals, with a first reference signal being one of the Q1 reference signals; there is a first-type relationship between the first radio signal and the first reference signal, and there is a second-type relationship between the first radio signal and one of the Q1 reference signals other than the first reference signal, where the first-type relationship and the second-type relationship are different; a time interval between a time for receiving the second information block and a time for receiving the first time-frequency resource set is equal to a first time length, and a relative magnitude of the first time length and a first time threshold is used to determine the first reference signal out of the Q1 reference signals; the first time threshold comprises a time length of a positive integer number of multicarrier symbol(s).

In one embodiment, the second communication device 450 comprises a memory that stores a computer readable instruction program, the computer readable instruction program generates actions when executed by at least one processor, which include: receiving a first information block and a second information block; and receiving a first radio signal in a first time-frequency resource set, the second information block being used to indicate the first time-frequency resource set; herein, the first information block is used to determine a first transmission configuration parameter group, the first transmission configuration parameter group comprising Q1 transmission configuration parameters, where the Q1 transmission configuration parameters are used together for receiving the first radio signal, Q1 being a positive integer greater than 1; the Q1 transmission configuration parameters are respectively used to determine Q1 reference signals, with a first reference signal being one of the Q1 reference signals; there is a first-type relationship between the first radio signal and the first reference signal, and there is a second-type relationship between the first radio signal and one of the Q1 reference signals other than the first reference signal, where the first-type relationship and the second-type relationship are different; a time interval between a time for receiving the second information block and a time for receiving the first time-frequency resource set is equal to a first time length, and a relative magnitude of the first time length and a first time threshold is used to determine the first reference signal out of the Q1 reference signals; the first time threshold comprises a time length of a positive integer number of multicarrier symbol(s).

In one embodiment, the first communication device 410 comprises at least one processor and at least one memory, the at least one memory comprises computer program codes; the at least one memory and the computer program codes are configured to be used in collaboration with the at least one processor. The first communication device 410 at least: transmits a first information block and a second information block; and transmits a first radio signal in a first time-frequency resource set, the second information block being used to indicate the first time-frequency resource set; herein, the first information block is used to determine a first transmission configuration parameter group, the first transmission configuration parameter group comprising Q1 transmission configuration parameters, where the Q1 transmission configuration parameters are used together for receiving the first radio signal, Q1 being a positive integer greater than 1; the Q1 transmission configuration parameters are respectively used to determine Q1 reference signals, with a first reference signal being one of the Q1 reference signals; there is a first-type relationship between the first radio signal and the first reference signal, and there is a second-type relationship between the first radio signal and one of the Q1 reference signals other than the first reference signal, where the first-type relationship and the second-type relationship are different; a time interval between a time for receiving the second information block and a time for receiving the first time-frequency resource set is equal to a first time length, and a relative magnitude of the first time length and a first time threshold is used to determine the first reference signal out of the Q1 reference signals; the first time threshold comprises a time length of a positive integer number of multicarrier symbol(s).

In one embodiment, the first communication device 410 comprises a memory that stores a computer readable instruction program, the computer readable instruction program generates actions when executed by at least one processor, which include: transmitting a first information block and a second information block; and transmitting a first radio signal in a first time-frequency resource set, the second information block being used to indicate the first time-frequency resource set; herein, the first information block is used to determine a first transmission configuration parameter group, the first transmission configuration parameter group comprising Q1 transmission configuration parameters, where the Q1 transmission configuration parameters are used together for receiving the first radio signal, Q1 being a positive integer greater than 1; the Q1 transmission configuration parameters are respectively used to determine Q1 reference signals, with a first reference signal being one of the Q1 reference signals; there is a first-type relationship between the first radio signal and the first reference signal, and there is a second-type relationship between the first radio signal and one of the Q1 reference signals other than the first reference signal, where the first-type relationship and the second-type relationship are different; a time interval between a time for receiving the second information block and a time for receiving the first time-frequency resource set is equal to a first time length, and a relative magnitude of the first time length and a first time threshold is used to determine the first reference signal out of the Q1 reference signals; the first time threshold comprises a time length of a positive integer number of multicarrier symbol(s).

In one embodiment, at least one of the antenna 452, the receiver 454, the multi-antenna receiving processor 458, the receiving processor 456, the controller/processor 459, the memory 460, or the data source 467 is used for receiving the first radio signal in the present application.

In one embodiment, at least one of the antenna 420, the receiver 418, the multi-antenna receiving processor 472, the receiving processor 470, the controller/processor 475, or the memory 476 is used for transmitting the first radio signal in the present application.

In one embodiment, at least one of the antenna 452, the receiver 454, the multi-antenna receiving processor 458, the receiving processor 456, the controller/processor 459, the memory 460, or the data source 467 is used for receiving the second radio signal in the present application.

In one embodiment, at least one of the antenna 420, the receiver 418, the multi-antenna receiving processor 472, the receiving processor 470, the controller/processor 475, or the memory 476 is used for transmitting the second radio signal in the present application.

Embodiment 5A

Figure 5A:
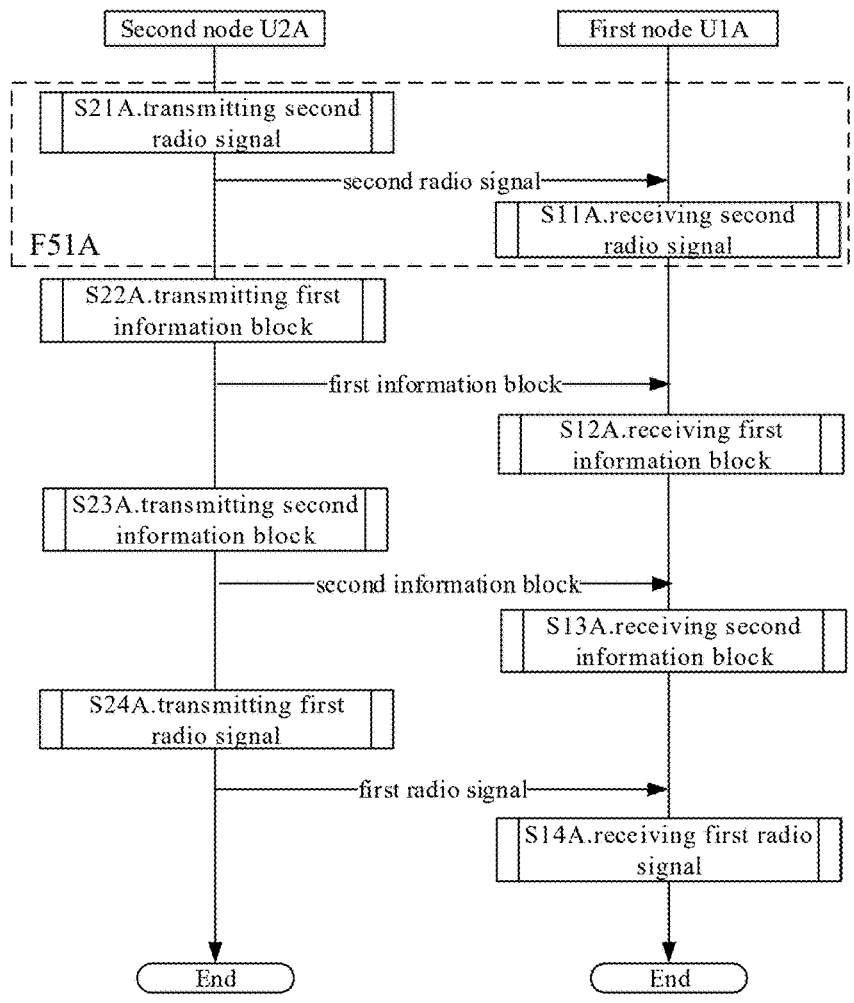
FIG. 5A illustrates a flowchart of radio signal transmission according to one embodiment of the present application.

Embodiment 5A illustrates a flowchart of radio signal transmission according to one embodiment of the present application, as shown in FIG. 5A. In FIG. 5A, a first node U1A and a second node U2A are in communications via an air interface. In FIG. 5A, the sequential step arrangement in each box herein does not imply a chronological order of steps marked respectively by these boxes.

The first node U1A receives a second radio signal in step S11A, and receives a first information block in step S12A, receives a second information block in step S13A, and receives a first radio signal in step S14A.

The second node U2A transmits a second radio signal in step S21A, and transmits a first information block in step S22A, transmits a second information block in step S23A, and transmits a first radio signal in step S24A. Herein, the step S21A and the step S11A in the dotted-line box F51A are optional.

In Embodiment 5A, the first node U1A receives a first information block and a second information block; and receives a first radio signal in a first time-frequency resource set, the second information block being used to indicate the first time-frequency resource set; herein, the first information block is used to determine a first transmission configuration parameter group, the first transmission configuration parameter group comprising Q1 transmission configuration parameters, where the Q1 transmission configuration parameters are used together for receiving the first radio signal, Q1 being a positive integer greater than 1; the Q1 transmission configuration parameters are respectively used to determine Q1 reference signals, with a first reference signal being one of the Q1 reference signals; there is a first-type relationship between the first radio signal and the first reference signal, and there is a second-type relationship between the first radio signal and one of the Q1 reference signals other than the first reference signal, where the first-type relationship and the second-type relationship are different; a time interval between a time for receiving the second information block and a time for receiving the first time-frequency resource set is equal to a first time length, and a relative magnitude of the first time length and a first time threshold is used to determine the first reference signal out of the Q1 reference signals; the first time threshold comprises a time length of a positive integer number of multicarrier symbol(s). the first node U1A receives a second radio signal, the second radio signal beginning to be transmitted before a start time of the first time-frequency resource set. Herein, Q2 transmission configuration parameters are used together for receiving the second radio signal, Q2 being a positive integer greater than 1; the Q2 transmission configuration parameters are respectively used to determine Q2 reference signals, with a second reference signal being one of the Q2 reference signals; there is the first-type relationship between the second radio signal and the second reference signal; when the first time length is smaller than the first time threshold, an index of a transmission configuration parameter associated with the second reference signal among the Q2 transmission configuration parameters is used to determine the first reference signal out of the Q1 reference signals.

In one embodiment, an air interface between the second node U2A and the first node U1A includes a PC5 interface.

In one embodiment, an air interface between the second node U2A and the first node U1A includes a sidelink.

In one embodiment, an air interface between the second node U2A and the first node U1A includes a Uu interface.

In one embodiment, an air interface between the second node U2A and the first node U1A includes a cellular link.

In one embodiment, an air interface between the second node U2A and the first node U1A includes a radio interface between a UE and another UE.

In one embodiment, an air interface between the second node U2A and the first node U1A includes a radio interface between a base station and a UE.

Embodiment 5B

Figure 5B:
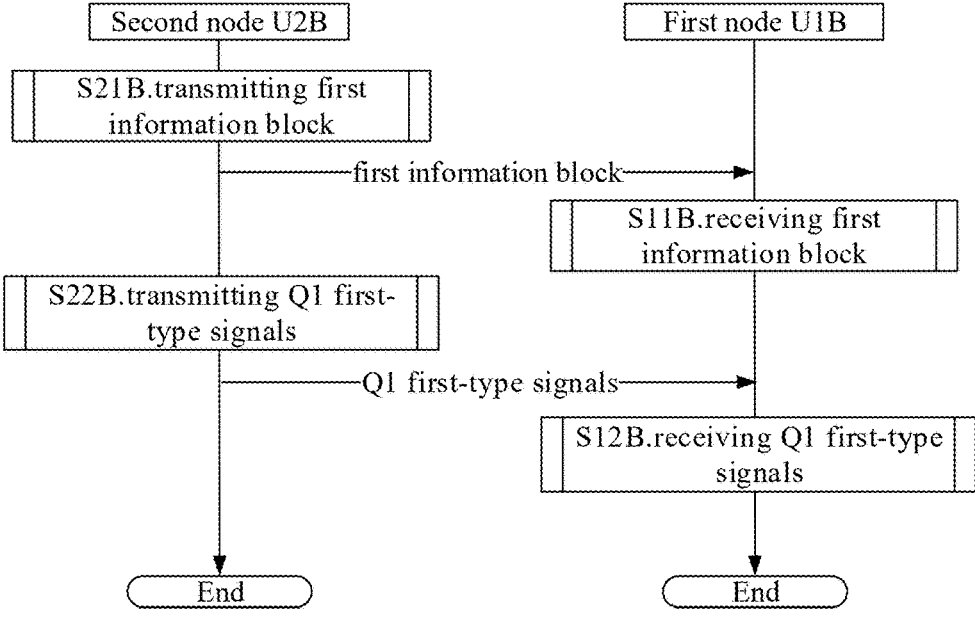
FIG. 5B illustrates a flowchart of radio signal transmission according to one embodiment of the present application.

Embodiment 5B illustrates a flowchart of radio signal transmission according to one embodiment of the present application, as shown in FIG. 5B. In FIG. 5B, a first node U1B and a second node U2B are in communications via an air interface. In FIG. 5B, the sequential step arrangement in each box herein does not imply a chronological order of steps marked respectively by these boxes.

The first node U1B receives a first information block in step S11B and receives Q1 first-type signals in step S12B.

The second node U2B transmits a first information block in step S21B and transmits Q1 first-type signals in step S22B.

In Embodiment 5B, the first node U1B receives the Q1 first-type signals respectively in Q1 first-type time-frequency resource sets, where Q1 is a positive integer greater than 1, the first information block being used to determine the Q1 first-type time-frequency resource sets; herein, a first data block is used for generating the Q1 first-type signals; the first information block is used to determine Q2 transmission configuration parameters, the Q2 transmission configuration parameters being used together for receiving the Q1 first-type signals, Q2 being a positive integer greater than 1; the Q2 transmission configuration parameters are respectively used to determine Q2 first-type reference signals; a first signal is one of the Q1 first-type signals; a first reference signal is one of the Q2 first-type reference signals; there is a first-type relationship between the first signal and the first reference signal, the first-type relationship being a candidate relationship among Q3 candidate relationships, where Q3 is a positive integer greater than 1; a position of the first signal in the Q1 first-type signals is used to determine the first reference signal out of the Q2 first-type reference signals.

In one embodiment, an air interface between the second node U2B and the first node U1B includes a PC5 interface.

In one embodiment, an air interface between the second node U2B and the first node U1B includes a sidelink.

In one embodiment, an air interface between the second node U2B and the first node U1B includes a Uu interface.

In one embodiment, an air interface between the second node U2B and the first node U1B includes a cellular link.

In one embodiment, an air interface between the second node U2B and the first node U1B includes a radio interface between a UE and another UE.

In one embodiment, an air interface between the second node U2B and the first node U1B includes a radio interface between a base station and a UE.

Embodiment 6

Figures 6, 7A, 7B:
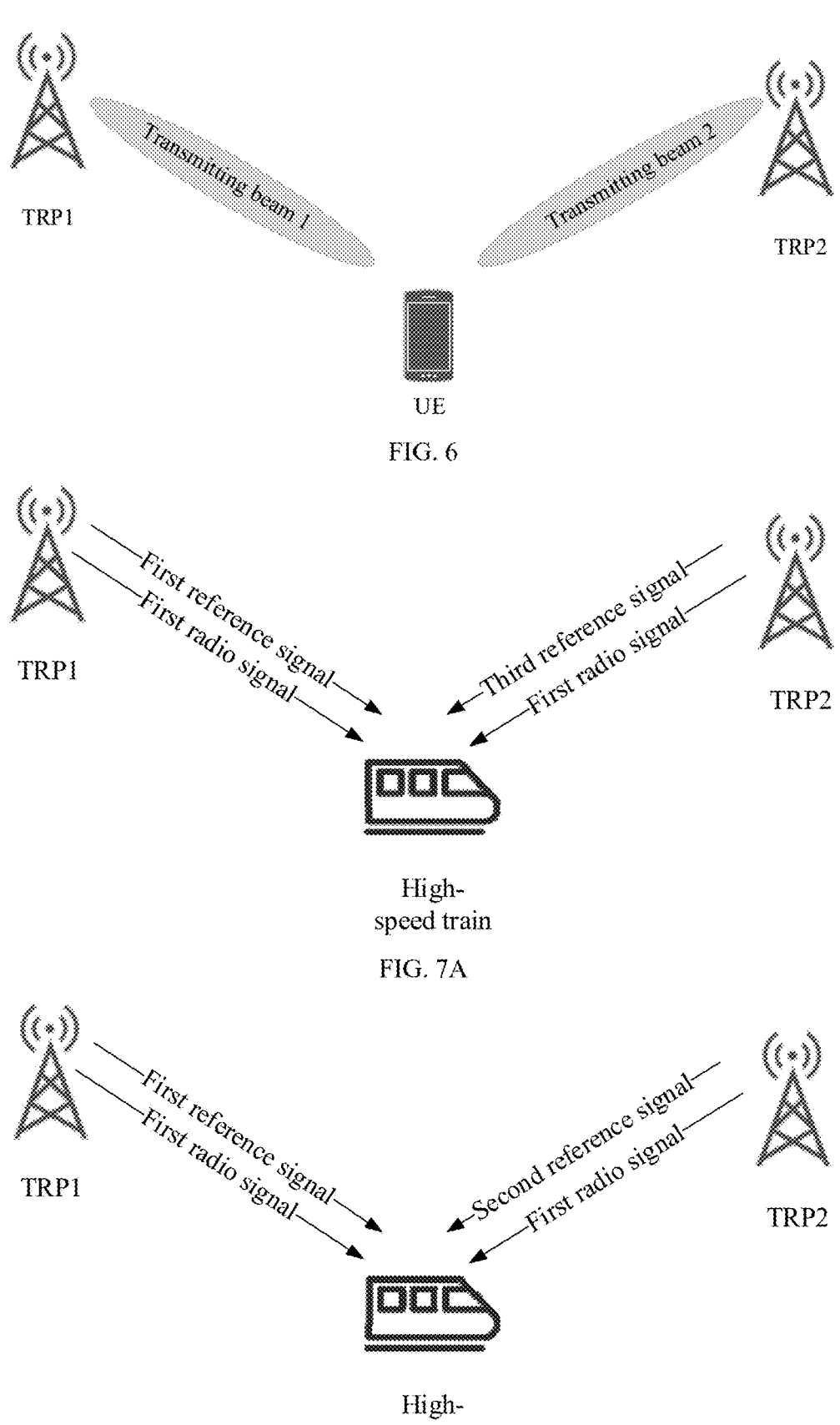
FIG. 6 illustrates a schematic diagram of SFN transmission according to one embodiment of the present application.
FIG. 7A illustrates a schematic diagram of signal transmission in HST-SFN scenario according to one embodiment of the present application.
FIG. 7B illustrates a schematic diagram of signal transmission in HST-SFN scenario according to another embodiment of the present application.

Embodiment 6 illustrates a schematic diagram of SFN transmission according to one embodiment of the present application, as shown in FIG. 6. In FIG. 6, a TRP1 and a TRP2 transmit radio signals to a UE simultaneously. Herein, the TRP1 transmits the radio signal to the UE through a transmitting beam 1, while the TRP2 transmits the radio signal to the UE through a transmitting beam 2. In Embodiment 6A, a first transmission configuration parameter group in the present application comprises 2 transmission configuration parameters, the 2 transmission configuration parameters being respectively used to determine the transmitting beam 1 and the transmitting beam 2. In Embodiment 6A, the difference between SFN and multi-TRP space-division multiplexing lies in that by means of SFN, antenna ports of the TRP1 and the TRP2 for transmitting radio signals are the same antenna port for the UE, and the radio signals transmitted by the TRP1 and the TRP2 are identical; while by means of multi-TRP space-division multiplexing, antenna ports for transmitting radio signals from the TRP1 and the TRP2 are different, and the radio signals transmitted by the TRP1 and the TRP2 can be different.

In one embodiment, Q1 is 2.

In one embodiment, the Q1 transmission configuration parameters are respectively used by Q1 third nodes for transmitting the first radio signal.

In one subembodiment, the Q1 third nodes have an identical cell ID.

In one subembodiment, the Q1 third nodes have different cell IDs.

In one subembodiment, the third node comprises a TRP.

In one subembodiment, the third node comprises a Remote Radio Unit (RRU).

In one subembodiment, the third node comprises a Remote Radio Head (RRH).

In one subembodiment, the third node comprises an Active Antenna Unit (AAU).

In one subembodiment, the third node comprises a Base-Band Unit (BBU).

In one subembodiment, the third node comprises a gNB.

In one embodiment, the second node comprises Q1 said third nodes.

In one embodiment, the second information block comprises second indication information, the second indication information being used to determine that a transmission mode of the first radio signal is by SFN.

In one embodiment, the Q1 transmission configuration parameters are used to determine Q1 transmitting beams of the second node.

In Embodiment 6B, Q2 in the present application is 2, the Q2 transmission configuration parameters being respectively used to determine the transmitting beam 1 and the transmitting beam 2. In Embodiment 6B, the difference between SFN and multi-TRP space-division multiplexing lies in that by means of SFN, antenna ports of the TRP1 and the TRP2 for transmitting radio signals are the same antenna port, and the radio signals transmitted by the TRP1 and the TRP2 are identical; while by means of multi-TRP space-division multiplexing, antenna ports for transmitting radio signals from the TRP1 and the TRP2 are different, and the radio signals transmitted by the TRP1 and the TRP2 can be different.

In one embodiment, Q2 is 2.

In one embodiment, the Q2 transmission configuration parameters are respectively used by Q2 third nodes for transmitting the first signal.

In one subembodiment, the Q2 third nodes have an identical cell ID.

In one subembodiment, the Q2 third nodes have different cell IDs.

In one subembodiment, the third node comprises a TRP.

In one subembodiment, the third node comprises a Remote Radio Unit (RRU).

In one subembodiment, the third node comprises a Remote Radio Head (RRH).

In one subembodiment, the third node comprises an Active Antenna Unit (AAU).

In one subembodiment, the third node comprises a Base-Band Unit (BBU).

In one subembodiment, the third node comprises a gNB.

In one subembodiment, the third node comprises a Distributed Unit (DU) in a gNB.

In one subembodiment, the third node comprises a Central Unit (CU) in a gNB.

In one embodiment, the second node comprises Q2 said third nodes.

In one embodiment, the second information block comprises first indication information, the first indication information being used to determine that a transmission mode of the first signal is SFN.

In one embodiment, the Q2 transmission configuration parameters are used to determine Q2 transmitting beams of the second node.

Embodiment 7A

Embodiment 7A illustrates a schematic diagram of signal transmission in HST-SFN scenario according to one embodiment of the present application, as shown in FIG. 7A. In FIG. 7A, a TRP1 and a TRP2 transmit radio signals to a UE in a high-speed train simultaneously. In Embodiment 7A, the TRP1 transmits a first reference signal and a first radio signal to a UE in a high-speed train, while the TRP2 transmits a third reference signal and a first radio signal to a UE in a high-speed train. In Embodiment 7A, the third reference signal is one of the Q1 reference signals of the present application other than the first reference signal.

In one embodiment, the first reference signal is used for tracking a reception timing and a reception frequency.

In one embodiment, the first reference signal is indicated for configuration of a parameter trs-Info.

In one embodiment, the third reference signal is one of the Q1 reference signals other than the first reference signal.

In one embodiment, the third reference signal is used for tracking a reception timing and a reception frequency.

In one embodiment, the third reference signal is indicated for configuration of a parameter trs-Info.

In one embodiment, the first reference signal and the third reference signal are both CSI-RSs.

In one embodiment, the first reference signal and the third reference signal are both DMRSs.

In one embodiment, the first reference signal and the third reference signal are both DMRSs of the first radio signal.

In one embodiment, the first reference signal and the third reference signal are orthogonal in time-frequency domain.

In one embodiment, the first reference signal is not performed with Doppler pre-compensation, while the third reference signal is performed with Doppler pre-compensation.

In one embodiment, both the first reference signal and the third reference signal are performed with Doppler pre-compensation.

In one embodiment, neither the first reference signal nor the third reference signal is performed with Doppler pre-compensation.

Embodiment 7B

Embodiment 7B illustrates a schematic diagram of signal transmission in HST-SFN scenario according to another embodiment of the present application, as shown in FIG. 7B. In FIG. 7B, a TRP1 and a TRP2 transmit radio signals to a UE in a high-speed train simultaneously. In Embodiment 7B, the TRP1 transmits a first reference signal and a first signal to a UE in a high-speed train, while the TRP2 transmits a second reference signal and a first signal to a UE in a high-speed train. In Embodiment 7B, the second reference signal is one of the Q2 first-type reference signals of the present application other than the first reference signal.

In one embodiment, the first reference signal is used for tracking a reception timing and a reception frequency.

In one embodiment, the first reference signal is indicated for configuration of a parameter trs-Info.

In one embodiment, the second reference signal is one of the Q1 reference signals other than the first reference signal.

In one embodiment, the second reference signal is used for tracking a reception timing and a reception frequency.

In one embodiment, the second reference signal is indicated for configuration of a parameter trs-Info.

In one embodiment, the first reference signal and the second reference signal are both CSI-RSs.

In one embodiment, the first reference signal and the second reference signal are both TRSs.

In one embodiment, the first reference signal and the second reference signal are both DMRSs.

In one embodiment, the first reference signal and the second reference signal are both DMRSs of the first signal.

In one embodiment, the first reference signal and the second reference signal are orthogonal in time-frequency domain.

In one embodiment, the first reference signal is not performed with Doppler shift pre-compensation, while the second reference signal is performed with Doppler shift pre-compensation.

In one embodiment, both the first reference signal and the second reference signal are performed with Doppler shift pre-compensation.

In one embodiment, neither the first reference signal nor the second reference signal is performed with Doppler shift pre-compensation.

In one embodiment, as shown in the scenario in Embodiment 7B, the TRP1 and the TRP2 are located in different directions of a high-speed train, so that Doppler shifts generated by radio signals respectively transmitted by the TRP1 and the TRP2 at the UE's receiver in the high-speed train are different.

Embodiment 8

Embodiment 8 illustrates a schematic diagram of Doppler Shift pre-compensation in SFN scenario according to one embodiment of the present application, as shown in FIG. 8A. In FIG. 8, the figure on the left represents a schematic diagram illustrating frequency ranges occupied by radio signals respectively transmitted by two TRPs at the UE's receiver in the case of not performing Doppler Shift pre-compensation, where the box filled with vertical lines and the box filled with horizontal lines respectively represent schematic diagrams of frequency ranges occupied by two radio signals respectively transmitted by a TRP1 and a TRP2 at the UE's receiver; herein, a central frequency corresponding to the radio signal transmitted by the TRP1 is f0+fd1, while a central frequency corresponding to the radio signal transmitted by the TRP2 is f0+fd2; herein, f0 represents the central transmission frequency of the TRP1 and the TRP2 (i.e., the TRP1 and the TRP2 have identical central transmission frequencies), fd1 represents a Doppler shift generated at the UE's receiver by a radio signal transmitted by the TRP1, while fd2 represents a Doppler shift generated at the UE's receiver by a radio signal transmitted by the TRP2. In FIG. 8A, the figure on the right represents a schematic diagram illustrating frequency ranges occupied by two radio signals respectively transmitted by two TRPs at the UE's receiver after performing Doppler Shift pre-compensation, where the frequency ranges of the radio signals transmitted by the TRP1 and the TRP2 at the UE's receiver are overlapping, the two TRPs' central frequencies are both f0+fd3, where fd3 represents a residual frequency offset left over by the Doppler shift pre-compensation. The f0, f1, f2, and f3 are all real numbers measured in Hz.

In one embodiment, the fd3 is equal to the fd1.

In one embodiment, when applying Doppler shift pre-compensation, a first signal transmitted by the TRP1 is not performed with Doppler Shift pre-compensation; a first signal transmitted by the TRP2 is performed with Doppler Shift pre-compensation, and a frequency offset of Doppler Shift pre-compensation performed on the TRP2 is fd1–fd2. In one embodiment, when applying Doppler pre-compensation, a transmission central frequency point of a first radio signal transmitted by the TRP1 is fa, and a transmission central frequency point of a first radio signal transmitted by the TRP2 is fa+f1–f2, where fa is a real number measured in Hz.

In one subembodiment, the central transmission frequency of the first reference signal is used to determine the fa.

In one subembodiment, the fa is equal to a central transmission frequency of the first reference signal.

In one subembodiment, the first reference signal is used to determine the fa.

In one subembodiment, the first reference signal is used to determine the fa+fd1.

In one subembodiment, the fa+fd1 is equal to a central reception frequency of the first reference signal.

In one embodiment, when applying Doppler shift pre-compensation, Doppler Shift pre-compensation is performed on both first signals respectively transmitted by the TRP1 and the TRP2.

In one embodiment, when applying Doppler shift pre-compensation, a central transmission frequency of a first signal transmitted by the TRP1 is fb–fd1, and a central transmission frequency of a first signal transmitted by the TRP2 is fb–fd2, where the fb is a real number measured in Hz.

In one subembodiment, the central transmission frequency of the first reference signal is used to determine the fb.

In one subembodiment, the first reference signal is used to determine the fb.

In one subembodiment, the first reference signal is used to determine the fb–fd1.

In one subembodiment, the fb is equal to a central transmission frequency of the first reference signal.

In one subembodiment, the fb–fd1 is equal to a central reception frequency of the first reference signal. In one subembodiment, the fb is equal to a sum of a central transmission frequency of the first reference signal and a frequency offset, the frequency offset being a real number measured in Hz.

In one embodiment, the first-type relationship comprises Doppler Shift Quasi Co-location relationship; the second-type relationship does not comprise a Doppler Shift Quasi Co-location relationship.

In one embodiment, the phrase that "the first-type relationship comprises Doppler Shift Quasi Co-location relationship" comprises that the first-type relationship comprises a first quasi co-location relationship, and large-scale properties comprised in the first quasi co-location relationship include Doppler Shift.

In one embodiment, the phrase that "the second-type relationship does not comprise Doppler Shift Quasi Co-location relationship" comprises that the second-type relationship comprises a second quasi co-location relationship, and large-scale properties comprised in the second quasi co-location relationship include Doppler Shift.

Embodiment 9A

Embodiment 9A illustrates a schematic diagram of a temporal relationship between a second information block and a first radio signal according to one embodiment of the present application, as shown in FIG. 9A. In FIG. 9A, two blank boxes respectively represent schematic diagrams of time-domain resources occupied by the second information block and the first radio signal. In Embodiment 9A, a length of a time interval between an end time of receiving the second information block and a start time of receiving the first time-frequency resource set is equal to a first time length.

In one embodiment, the phrase in the present application that "a time interval between a time for receiving the second information block and a time for receiving the first time-frequency resource set" comprises: a length of a time interval between an end time of receiving the second information block and a start time of receiving the first time-frequency resource set.

In one embodiment, the phrase in the present application that "a time interval between a time for receiving the second information block and a time for receiving the first time-frequency resource set" comprises: a length of a time interval between a start time of receiving the second information block and a start time of receiving the first time-frequency resource set.

In one embodiment, the phrase in the present application that "a time interval between a time for receiving the second information block and a time for receiving the first time-frequency resource set" comprises: a length of a time interval between a start time of receiving the second information block and an end time of receiving the first time-frequency resource set.

In one embodiment, the phrase in the present application that "a time interval between a time for receiving the second information block and a time for receiving the first time-frequency resource set" comprises: a length of a time interval between an end time of receiving the second information block and an end time of receiving the first time-frequency resource set.

In one embodiment, the phrase in the present application that "a time interval between a time for receiving the second information block and a time for receiving the first time-frequency resource set" comprises: a length of a time interval between an end time of receiving a slot to which the second information block belongs and a start time of receiving the first time-frequency resource set.

In one embodiment, the phrase in the present application that "a time interval between a time for receiving the second information block and a time for receiving the first time-frequency resource set" comprises: a length of a time interval between an end time of receiving a slot by which the second information block is comprised and a start time of receiving a slot by which the first time-frequency resource set is comprised.

In one subembodiment, a start time of receiving the second information block is a time of starting to receive a first multicarrier symbol in the second information block.

In one subembodiment, an end time of receiving the second information block is a time of completing reception of a last multicarrier symbol in the second information block.

In one subembodiment, a start time of receiving the first time-frequency resource set is a time of starting to receive a first multicarrier symbol in the first time-frequency resource set.

In one subembodiment, an end time of receiving the first time-frequency resource set is a time of completing reception of a last multicarrier symbol in the first time-frequency resource set.

In one embodiment, the first time threshold comprises a consecutive time length.

In one embodiment, the first time threshold comprises a time length of a positive integer number of multicarrier symbol(s).

In one embodiment, the multicarrier symbol comprises an OFDM symbol.

In one embodiment, the multicarrier symbol comprises a DFT-s-OFDM symbol.

In one embodiment, the multicarrier symbol comprises a SC-FDMA symbol.

In one embodiment, the first time threshold comprises a positive integer number of slot(s).

In one embodiment, the second information block indicates the first transmission configuration parameter group.

In one embodiment, the first time threshold comprises a shortest period of time required for receiving the second information block and applying the first transmission configuration parameter group indicated by the second information block.

In one embodiment, the first time threshold comprises a shortest period of time required from starting to receive a first multicarrier symbol occupied by the second information block to being able to apply the first transmission configuration parameter group indicated by the second information block.

In one embodiment, the first time threshold comprises a shortest period of time required from completing reception of a last multicarrier symbol occupied by the second information block to being able to apply the first transmission configuration parameter group indicated by the second information block.

In one embodiment, the first time threshold comprises a shortest time interval required for receiving a PDCCH and applying a QCL configuration parameter indicated in the PDCCH.

In one embodiment, the first time threshold comprises a shortest period of time required from starting to receive a first multicarrier symbol occupied by a PDCCH to being able to apply the QCL configuration parameter indicated by the PDCCH.

In one embodiment, the first time threshold comprises a shortest period of time required from completing reception of a last multicarrier symbol occupied by a PDCCH to being able to apply the QCL configuration parameter indicated by the PDCCH.

In one embodiment, a subcarrier spacing (SCS) of subcarriers occupied by the first radio signal in frequency domain is used to determine the first time threshold.

In one embodiment, the first time threshold is configured by a higher layer signaling.

In one embodiment, the first time threshold is configured by an RRC signaling.

In one embodiment, the first time threshold is configured by a timeDurationForQCL field in an RRC signaling.

In one embodiment, the second information block comprises first indication information; when the first time length is no smaller than the first time threshold, the first indication information is used to determine the first reference signal out of the Q1 reference signals.

In one embodiment, the first indication information explicitly indicates the first reference signal out of the Q1 reference signals.

In one embodiment, the first indication information implicitly indicates the first reference signal out of the Q1 reference signals.

In one embodiment, the first indication information is used to determine multiple reference signals, and numbering of the multiple reference signals is used to determine the first reference signal out of the Q1 reference signals.

In one embodiment, the first indication information is used to determine multiple transmission configuration parameters, and numbering of the multiple transmission configuration parameters is used to determine the first reference signal out of the Q1 reference signals.

In one embodiment, the first indication information is used to determine multiple transmission configuration parameters, where a reference signal associated with a first transmission configuration parameter among the multiple transmission configuration parameters is the first reference signal.

In one embodiment, the first indication information indicates a transmission configuration parameter, the first reference signal being a reference signal comprised in the transmission configuration parameter indicated by the first indication information.

In one embodiment, when the first time length is smaller than the first time threshold, the first reference signal is a reference signal determined by a transmission configuration parameter with a lowest index among the Q1 transmission configuration parameters.

In one subembodiment, the "transmission configuration parameter with a lowest index among the Q1 transmission configuration parameters" refers to a first transmission configuration parameter among the Q1 transmission configuration parameters.

In one subembodiment, a transmission configuration parameter with a lowest index among the Q1 transmission configuration parameters is used to determine multiple reference signals, where the first reference signal is a reference signal configured with trs-Info among the multiple reference signals.

In one subembodiment, a transmission configuration parameter with a lowest index among the Q1 transmission configuration parameters is used to determine multiple reference signals, where the first reference signal is a reference signal having QCL-TypeA Relation among the multiple reference signals.

Embodiment 9B

Embodiment 9B illustrates a schematic diagram of reception frequencies of a first reference signal, a second reference signal and a first signal according to one embodiment of the present application, as shown in FIG. 9B. In FIG. 9B, the rectangular box filled with vertical lines in figure (a) illustrates a reception frequency range of a first reference signal at a receiver of the first node, where f0+fd1+a1 represents a central reception frequency of the first reference signal, f0 represents a central transmission frequency of the first reference signal, and fd1 represents a Doppler shift generated by the first reference signal at the receiver of the first node, and a1 represents a residual frequency offset upon reception of the first reference signal; the rectangular box filled with horizontal lines in figure (b) illustrates a reception frequency range of a second reference signal at a receiver of the first node, where f0+fd2+a2 represents a central reception frequency of the second reference signal, f0 represents a central transmission frequency of the second reference signal, and fd2 represents a Doppler shift generated by the second reference signal at the receiver of the first node, and a2 represents a residual frequency offset upon reception of the second reference signal; the rectangular box filled with grids in figure (c) illustrates a reception frequency range of a first signal at a receiver of the first node, where f0+fd1+a3 represents a central reception frequency of the first signal, f0 represents a central transmission frequency of the first signal, and fd2 represents a Doppler shift generated by the first signal at the receiver of the first node, and a3 represents a residual frequency offset upon reception of the first signal. Herein, the f0, fd1, fd2, a1, a2 and a3 are all real numbers measured in Hz. In Embodiment 9B, there is a first-type relationship between the first signal and the first reference signal, while between the first signal and the second reference signal there exists a second-type relationship. The residual frequency offset is generated due to an error from a transmitter or a receiver, or purposely based on practical design by the transmitter or the receiver.

In one embodiment, the a1, a2 and a3 are 0.

In one embodiment, one of the a1, a2 and a3 is 0.

In one embodiment, a second-type relationship is a candidate relationship among the Q3 candidate relationships, the second-type relationship being different from the first-type relationship.

In one embodiment, there is a second-type relationship between the first signal and any first-type reference signal among the Q2 first-type reference signals other than the first reference signal.

In one embodiment, the first-type relationship comprises a first-type quasi co-location relationship, the first-type quasi co-location relationship comprising a Doppler Shift Quasi Co-location relationship; the second-type relationship comprises a second-type quasi co-location relationship, the second-type quasi co-location relationship not comprising a Doppler Shift Quasi Co-location relationship.

In one embodiment, the sentence that "there is a second-type relationship between the first signal and any first-type reference signal among the Q2 first-type reference signals other than the first reference signal" comprises that any first-type reference signal among the Q2 first-type reference signals other than the first reference signal is not used to determine a frequency of the first signal.

In one embodiment, the first reference signal is used to determine a frequency of the first signal, while the second reference signal is not used to determine a frequency of the first signal.

In one subembodiment, the frequency of the first signal includes a transmission frequency of the first signal.

In one subembodiment, the frequency of the first signal includes a reception frequency of the first signal.

In one subembodiment, the frequency of the first signal includes a central transmission frequency of the first signal.

In one subembodiment, the frequency of the first signal includes a central reception frequency of the first signal.

In one subembodiment, the frequency of the first signal includes a frequency offset of the first signal.

In one subembodiment, the frequency of the first signal includes a Doppler shift of the first signal.

In one subembodiment, the frequency of the first signal includes a Doppler spread of the first signal.

In one embodiment, the second-type relationship includes a second-type QCL Relation.

In one embodiment, the second-type relationship includes QCL Relation.

In one embodiment, the second-type relationship includes QCL TypeE.

In one embodiment, the second-type relationship includes a second-type QCL relation, where large-scale properties of the second-type QCL relation do not include Doppler shift.

In one embodiment, the second-type relationship includes a second-type QCL relation, where large-scale properties of the second-type QCL relation do not include Doppler spread.

In one embodiment, the sentence that "there is a second-type relationship between the first signal and any first-type reference signal among the Q2 first-type reference signals other than the first reference signal" comprises that any first-type reference signal among the Q2 first-type reference signals other than the first reference signal has a different reception frequency from the first signal.

In one embodiment, the sentence that "there is a second-type relationship between the first signal and any first-type reference signal among the Q2 first-type reference signals other than the first reference signal" comprises that any first-type reference signal among the Q2 first-type reference signals other than the first reference signal has a different transmission frequency from the first signal.

In one embodiment, the sentence that "there is a second-type relationship between the first signal and any first-type reference signal among the Q2 first-type reference signals other than the first reference signal" comprises that any first-type reference signal among the Q2 first-type reference signals other than the first reference signal has a different Doppler shift from the first signal.

In one embodiment, the sentence that "there is a second-type relationship between the first signal and any first-type reference signal among the Q2 first-type reference signals other than the first reference signal" comprises that any first-type reference signal among the Q2 first-type reference signals other than the first reference signal has a different Doppler spread from the first signal.

In one embodiment, the sentence that "there is a second-type relationship between the first signal and any first-type reference signal among the Q2 first-type reference signals other than the first reference signal" comprises that any first-type reference signal among the Q2 first-type reference signals other than the first reference signal is used to determine a spatial receive filter of the first signal.

In one embodiment, the sentence that "there is a second-type relationship between the first signal and any first-type reference signal among the Q2 first-type reference signals other than the first reference signal" comprises that if QCL parameter(s) comprised in the second-type relationship includes Doppler Shift, the Doppler Shift comprised in the QCL parameter(s) comprised in the second-type relationship is not used for receiving the first signal.

In one embodiment, the sentence that "there is a second-type relationship between the first signal and any first-type reference signal among the Q2 first-type reference signals other than the first reference signal" comprises that if QCL parameter(s) comprised in the second-type relationship includes Doppler Spread, the Doppler Spread comprised in the QCL parameter(s) comprised in the second-type relationship is not used for receiving the first signal.

In one subembodiment, the first signal is a single PDSCH.

In one subembodiment, the first signal is a single DMRS port.

In one subembodiment, the first signal is a single CSI-RS port.

In one embodiment, there being a Doppler shift Quasi Co-location relationship between a signal and another signal in the present application means that there exists a QCL relation between the signal and the other signal, and large-scale properties of the QCL relation between the signal and the other signal include Doppler shift.

Embodiment 10A

Embodiment 10A illustrates a schematic diagram of temporal relationships between a second radio signal, a second information block and a first radio signal according to one embodiment of the present application, as shown in FIG. 10A. In FIG. 10A, three blank boxes respectively represent schematic diagrams of time-domain resources occupied by the second radio signal, the second information block and the first radio signal. In Embodiment 10A, a length of a time interval between an end time of receiving the second information block and a start time of receiving the first time-frequency resource set is equal to a first time length, and a start time of receiving the second radio signal is earlier than a start time of receiving the first radio signal.

In one embodiment, the second radio signal comprises a PDSCH.

In one embodiment, the second radio signal comprises a PDCCH.

In one embodiment, the second radio signal comprises a DMRS.

In one embodiment, the second radio signal comprises a PUSCH.

In one embodiment, the second radio signal comprises a PUCCH.

In one embodiment, the second radio signal comprises an SRS.

In one embodiment, the second radio signal comprises a PSSCH.

In one embodiment, the second radio signal comprises a PSCCH.

In one embodiment, the second radio signal comprises a CSI-RS.

In one embodiment, the second radio signal comprises a PTRS.

In one embodiment, a time interval between a time of receiving the second radio signal and a time of receiving the first radio signal is larger than a second time threshold, where the time length of the second time threshold is equal to a time length of a positive integer number of multicarrier symbol(s).

In one embodiment, a time of receiving the second radio signal is earlier than a time of receiving the first radio signal.

In one embodiment, a time of receiving the second radio signal is earlier than a time of receiving the second information block.

In one subembodiment, a time of receiving the second radio signal includes a start time of receiving the second radio signal.

In one subembodiment, a time of receiving the second radio signal includes an end time of receiving the second radio signal.

In one subembodiment, a time of receiving the first radio signal includes a start time of receiving the second radio signal.

In one subembodiment, a time of receiving the first radio signal includes an end time of receiving the second radio signal.

In one subembodiment, a time of receiving the second information block includes a start time of receiving the second radio signal.

In one subembodiment, a time of receiving the second information block includes an end time of receiving the second radio signal.

In one embodiment, the second radio signal is a latest radio signal being transmitted by Q1 transmission configuration parameters before the time of receiving the first radio signal.

In one embodiment, the second radio signal is a latest radio signal being transmitted by means of SFN before the time of receiving the first radio signal.

In one embodiment, the second radio signal is a latest radio signal being transmitted by a transmission configuration parameter with the first-type relationship before the time of receiving the first radio signal;

Q2 transmission configuration parameters are used together for receiving the second radio signal, Q2 being a positive integer greater than 1; the Q2 transmission configuration parameters are respectively used to determine Q2 reference signals, with a second reference signal being one of the Q2 reference signals; there is the first-type relationship between the second radio signal and the second reference signal; when the first time length is smaller than the first time threshold, an index of a transmission configuration parameter associated with the second reference signal among the Q2 transmission configuration parameters is used to determine the first reference signal out of the Q1 reference signals.

In one embodiment, when the first time length is smaller than the first time threshold, an index of a transmission configuration parameter associated with the second reference signal among the Q2 transmission configuration parameters and a number of a transmission configuration parameter associated with the first reference signal among the Q1 transmission configuration parameters are identical.

In one embodiment, an index of a transmission configuration parameter associated with the second reference signal among the Q2 transmission configuration parameters is associated with a TRP, while a number of a transmission configuration parameter associated with the first reference signal among the Q1 transmission configuration parameters is associated with a TRP.

In one embodiment, an index of a transmission configuration parameter associated with the second reference signal among the Q2 transmission configuration parameters is associated with a TRP number, while a number of a transmission configuration parameter associated with the first reference signal among the Q1 transmission configuration parameters is associated with a TRP number.

In one embodiment, an index of a transmission configuration parameter associated with the second reference signal among the Q2 transmission configuration parameters is related to a TRP transmitting the second reference signal.

In one embodiment, a number of a transmission configuration parameter associated with the first reference signal among the Q1 transmission configuration parameters is associated with a first grouping index, while an index of a transmission configuration parameter associated with the second reference signal among the Q2 transmission configuration parameters is associated with a second grouping index.

In one subembodiment, the first grouping index is associated with a TRP, while the second grouping index is associated with a TRP.

In one embodiment, when the first time length is smaller than the first time threshold, the first grouping index and the second grouping index are identical.

In one embodiment, the transmission configuration parameter associated with the second reference signal is one of the Q2 transmission configuration parameters that is used to determine the second reference signal.

In one embodiment, the transmission configuration parameter associated with the first reference signal is one of the Q1 transmission configuration parameters that is used to determine the first reference signal.

In one embodiment, any one of the Q2 transmission configuration parameters comprises a spatial domain filter.

In one embodiment, any one of the Q2 transmission configuration parameters comprises a transmission configuration indicator (TCI).

In one embodiment, any one of the Q2 transmission configuration parameters comprises a TCI state.

In one embodiment, any one of the Q2 transmission configuration parameters comprises a TCI Codepoint.

In one embodiment, the first transmission configuration parameter group comprises TCI Codepoints.

In one embodiment, any one of the Q2 transmission configuration parameters comprises a Spatial Relation parameter.

In one embodiment, any one of the Q2 transmission configuration parameters comprises a Quasi-CoLocation parameter.

In one embodiment, any one of the Q2 transmission configuration parameters is used to determine a transmitting beam.

In one embodiment, any one of the Q2 transmission configuration parameters is used to determine a receiving beam.

In one embodiment, any one of the Q2 transmission configuration parameters is used to determine a spatial transmission filter.

In one embodiment, any one of the Q2 transmission configuration parameters is used to determine a spatial receive filter.

In one embodiment, any one of the Q2 transmission configuration parameters is used to determine a Spatial Relation with a reference signal.

In one embodiment, any one of the Q2 transmission configuration parameters is used to determine a QCL relation with a reference signal.

In one subembodiment, the reference signal comprises one of an SSB, a CSI-RS, a TRS, an SRS, a PTRS, or a DMRS.

Embodiment 10B

Embodiment 10B illustrates a schematic diagram of the Q1 first-type time-frequency resource sets respectively occupied by the Q1 first-type signals according to one embodiment of the present application, as shown in FIG. 10B. In FIG. 10B, three blank boxes are respectively used for representing time-frequency resources respectively occupied by a first-type signal #1, a first-type signal #2 and a first-type signal #Q, where #1, #2 and #3 are respectively used for indicating a first, a second and a Q1-th first-type signal after numbering the Q1 first-type signals in chronological order. In FIG. 10B, the range of time domain and frequency domain corresponding to each box is presented just for illustration, rather than symbolizing the actual resource size or denoting the continuity of resource occupancy.

In one embodiment, the Q1 first-type signals are Q1 repetitions of the first data block.

In one embodiment, the Q1 first-type signals are Q1 transmissions indicated by the first information block.

In one embodiment, the Q1 first-type signals are Q1 semi-persistently scheduled PDSCHs indicated by the first information block.

In one embodiment, the Q1 first-type signals are Q1 repeatedly transmitted PDSCHs indicated by the first information block.

In one embodiment, the Q1 first-type signals are Q1 repeatedly transmitted PDCCHs indicated by the first information block.

In one embodiment, any of the Q1 first-type time-frequency resource sets comprises a positive integer number of Resource Element(s) (RE(s)) in frequency domain.

In one embodiment, any of the Q1 first-type time-frequency resource sets comprises a positive integer number of Resource Block(s) (RB(s)) in frequency domain.

In one embodiment, any of the Q1 first-type time-frequency resource sets comprises a positive integer number of Resource Block Group(s) (RBG(s)) in frequency domain.

In one embodiment, any of the Q1 first-type time-frequency resource sets comprises a positive integer number of Control Channel Element(s) (CCE(s)) in frequency domain.

In one embodiment, any of the Q1 first-type time-frequency resource sets comprises a positive integer number of multicarrier symbol(s) in time domain.

In one embodiment, any of the Q1 first-type time-frequency resource sets comprises a positive integer number of slot(s) in time domain.

In one embodiment, any of the Q1 first-type time-frequency resource sets comprises a positive integer number of subframe(s) in time domain.

In one embodiment, any of the Q1 first-type time-frequency resource sets comprises a plurality of consecutive multicarrier symbols in time domain.

In one embodiment, any of the Q1 first-type time-frequency resource sets comprises a plurality of consecutive resource blocks in frequency domain.

In one embodiment, any of the Q1 first-type time-frequency resource sets comprises a plurality of non-consecutive resource blocks in frequency domain.

In one embodiment, frequency resources respectively occupied by the Q1 first-type time-frequency resource sets are identical.

In one embodiment, time-domain resources respectively occupied by the Q1 first-type time-frequency resource sets are identical.

In one embodiment, any two first-type time-frequency resource sets among the Q1 first-type time-frequency resource sets that are adjacent in time domain occupy consecutive resources in time domain.

In one embodiment, time-domain resources occupied by any 2 first-type time-frequency resources in the Q1 first-type time-frequency resource sets are non-overlapping.

In one embodiment, frequency-domain resources occupied by any 2 first-type time-frequency resources in the Q1 first-type time-frequency resource sets are non-overlapping.

In one embodiment, any 2 first-type time-frequency resources in the Q1 first-type time-frequency resource sets are in different slots.

In one embodiment, 2 first-type time-frequency resources in the Q1 first-type time-frequency resource sets are in a same slot.

Embodiment 11

Embodiment 11 illustrates a schematic diagram of multiple transmission configuration parameter groups and transmission configuration parameters respectively comprised in the multiple transmission configuration parameter groups according to one embodiment of the present application, as shown in FIG. 11. FIG. 11 illustrates N transmission configuration parameter groups, the N transmission configuration parameter groups being sequentially numbered with #1, #2 . . . , and #N, respectively. Herein, any of the N transmission configuration parameter groups comprises one or more transmission configuration parameters, and the one or more transmission configuration parameters comprised in any of the N transmission configuration parameter groups is/are numbered in sequence, for instance, a transmission configuration parameter group #1 comprises M1 transmission configuration parameter(s), which is/are sequentially numbered in #1, #2 . . . , and #M1, respectively; a transmission configuration parameter group #2 comprises M2 transmission configuration parameter(s), which is/are sequentially numbered in #1, #2 . . . , and #M2, respectively; and so on, for transmission configuration parameters comprised in other transmission configuration parameter groups that follow. N is an integer greater than 1, M1, M2 and M3 are positive integers, respectively.

In one embodiment, the first information block is used to determine Q3 transmission configuration parameter groups, and any of the Q3 transmission configuration parameter groups comprises Q4 transmission configuration parameter(s), where Q3 is a positive integer greater than 1, and Q4 is a positive integer; when the first time length is smaller than the first time threshold, the first transmission configuration parameter group is a transmission configuration parameter group with a lowest index among the Q3 transmission configuration parameter groups that comprises the Q1 transmission configuration parameters.

In one embodiment, the first information block comprises partial or all fields in a MAC-CE.

In one embodiment, the first information block is used for activating transmission configuration parameters.

In one embodiment, the first information block is used for activating a TCI state.

In one embodiment, the first information block is used to determine Q3 TCI codepoints, where any of the Q3 TCI codepoints comprises Q4 TCI state(s).

In one embodiment, the second information block comprises a first TCI codepoint number, the first TCI codepoint number being used to determine a TCI codepoint from the Q3 TCI codepoints, where the TCI codepoint being determined is used to determine the first transmission configuration parameter group.

In one embodiment, the first information block is used to determine a first transmission configuration parameter group, the Q2 transmission configuration parameters belonging to the first transmission configuration parameter group.

In one embodiment, a second information block is used to determine Q4 transmission configuration parameter groups, and the first transmission configuration parameter group is one of the Q4 transmission configuration parameter groups, any of the Q4 transmission configuration parameter groups comprising Q5 transmission configuration parameter(s), where Q4 is a positive integer greater than 1, and Q5 is a positive integer.

In one embodiment, any of the Q4 transmission configuration parameter groups comprises one TCI codepoint.

In one embodiment, any of the Q5 transmission configuration parameter(s) is a TCI state.

In one embodiment, the second information block comprises partial or all fields in a MAC-CE.

In one embodiment, the second information block is used for activating transmission configuration parameters.

In one embodiment, the second information block is used for activating a TCI state.

In one embodiment, the second information block is used to determine Q4 TCI codepoints, any of the Q4 TCI codepoints comprising Q5 TCI state(s).

In one embodiment, the first information block comprises a first TCI codepoint number, the first TCI codepoint number being used to determine a TCI codepoint from the Q4 TCI codepoints, where the TCI codepoint being determined is used to determine the Q2 transmission configuration parameters.

Embodiment 12A

Embodiment 12A illustrates a structure block diagram of a processing device used in a first node, as shown in FIG. 12A. In Embodiment 12A, a first node 1200A comprises a first receiver 1201A.

In one embodiment, the first receiver 1201A comprises at least one of the antenna 452, the transmitter/receiver 454, the multi-antenna receiving processor 458, the receiving processor 456, the controller/processor 459, the memory 460 or the data source 467 in FIG. 4 of the present application.

In Embodiment 12A, the first receiver 1201A receives a first information block and a second information block, and receives a first radio signal in a first time-frequency resource set, the second information block being used to indicate the first time-frequency resource set; herein, the first information block is used to determine a first transmission configuration parameter group, the first transmission configuration parameter group comprising Q1 transmission configuration parameters, where the Q1 transmission configuration parameters are used together for receiving the first radio signal, Q1 being a positive integer greater than 1; the Q1 transmission configuration parameters are respectively used to determine Q1 reference signals, with a first reference signal being one of the Q1 reference signals; there is a first-type relationship between the first radio signal and the first reference signal, and there is a second-type relationship between the first radio signal and one of the Q1 reference signals other than the first reference signal, where the first-type relationship and the second-type relationship are different; a time interval between a time for receiving the second information block and a time for receiving the first time-frequency resource set is equal to a first time length, and a relative magnitude of the first time length and a first time threshold is used to determine the first reference signal out of the Q1 reference signals; the first time threshold comprises a time length of a positive integer number of multicarrier symbol(s).

In one embodiment, the first node 1200A is a UE.

In one embodiment, the first node 1200A is a relay node.

In one embodiment, the first node 1200A is a base station.

In one embodiment, the first node 1200A is vehicle-mounted communication equipment.

In one embodiment, the first node 1200A is a UE supporting V2X communications.

In one embodiment, the first node 1200A is a relay node supporting V2X communications.

In one embodiment, the first node 1200A is a base station supporting IAB.

Embodiment 12B

Embodiment 12B illustrates a schematic diagram of time-domain resources respectively occupied by four first-type signals and reference signals that have first-type relationship respectively with the four first-type signals according to one embodiment of the present application, as shown in FIG. 12B. In FIG. 12B, four blank boxes are respectively used for representing time-frequency resources respectively occupied by a first-type signal #1, a first-type signal #2, a first-type signal #3 and a first-type signal #4, where #1, #2, #3 and #4 are used for respectively denoting numbers of a first, a second, a third and a fourth first-type signals after numbering the four first-type signals in chronological order. In Embodiment 12B, the first-type signal #1 and the first-type signal #3 both have a first-type relationship with the first reference signal; the first-type signal #2 and the first-type signal #4 both have a first-type relationship with the second reference signal. In Embodiment 12B, the Q1 is 4 and the Q2 is 2 in the present application.

In one embodiment, a position of the first signal in the Q1 first-type signals is used to determine the first reference signal out of the Q2 first-type reference signals.

In one embodiment, the position of the first signal in the Q1 first-type signals includes a time-domain position of the first signal in the Q1 first-type signals.

In one embodiment, the position of the first signal in the Q1 first-type signals includes a frequency-domain position of the first signal in the Q1 first-type signals.

In one embodiment, the Q1 first-type signals are numbered in chronological order, and the position of the first signal in the Q1 first-type signals comprises a number of the first signal in the Q1 first-type signals.

In one embodiment, the Q1 first-type signals are Q1 repetitions of the first data block, when a number of the first signal in the Q1 first-type signals is K1, the first signal is a K1-th repetition of the first data block, where K1 is an integer between 1 and Q1.

In one embodiment, the Q1 first-type signals are Q1 repetitions of the first data block, when a number of the first signal in the Q1 first-type signals is K1, the first signal is a (K1+1)-th repetition of the first data block, where K1 is an integer between 0 and Q1−1.

In one embodiment, when time-domain resources respectively occupied by any two first-type signals among the Q1 first-type signals are overlapping, any two first-type signals of the Q1 first-type signals have an identical number.

In one embodiment, Q2 is 2, the Q2 first-type reference signals comprising a first candidate reference signal and a second candidate reference signal, when a number of the first signal in the Q1 first-type signals is an odd number, the first reference signal is the first candidate reference signal; when the number of the first signal in the Q1 first-type signals is an even number, the first reference signal is the second candidate reference signal.

In one embodiment, a number of the first signal among the Q1 first-type signals is K1, K1 being an integer between 0 and Q1−1; the Q2 first-type signals are numbered in sequence, and a number of any first-type reference signal among the Q2 first-type reference signals is K2, K2 being an integer between 0 and Q2−1; the number of the first reference signal among the Q2 first-type reference signals is:

Mod (K1, Q2), where Mod denotes Modulus Operation, and Mod (K1,Q2) denotes K1 mod Q2 operation.

In one embodiment, a number of the first signal among the Q1 first-type signals is K1, K1 being an integer between 0 and Q1−1; the Q2 first-type signals are numbered in sequence, and a number of any first-type reference signal among the Q2 first-type reference signals is K2, K2 being an integer between 1 and Q2; the number of the first reference signal among the Q2 first-type reference signals is: Mod (K1, Q2)+1, where Mod denotes Modulus Operation, and Mod (K1,Q2) denotes K1 mod Q2 operation.

In one embodiment, a number of the first signal among the Q1 first-type signals is K1, K1 being an integer between 1 and Q1; the Q2 first-type signals are numbered in sequence, and a number of any first-type reference signal among the Q2 first-type reference signals is K2, K2 being an integer between 1 and Q2; the number of the first reference signal among the Q2 first-type reference signals is: Mod (K1−1, Q2)+1, where Mod denotes Modulus Operation, and Mod (K1−1,Q2) denotes K1−1 mod Q2 operation.

In one embodiment, a number of the first signal among the Q1 first-type signals is K1, K1 being an integer between 1 and Q1; the Q2 first-type signals are numbered in sequence, and a number of any first-type reference signal among the Q2 first-type reference signals is K2, K2 being an integer between 0 and Q2−1; the number of the first reference signal among the Q2 first-type reference signals is: Mod (K1−1, Q2), where Mod denotes Modulus Operation, and Mod (K1−1,Q2) denotes K1−1 mod Q2 operation.

In one embodiment, the first information block is used to determine the first reference signal and the second reference signal out of the Q2 first-type reference signals.

In one embodiment, a position of the first signal in the Q1 first-type signals is used together with the first information block to determine the first reference signal and the second reference signal out of the Q2 first-type reference signals.

In one embodiment, the first information block is used to determine a number of any first-type reference signal among the Q2 first-type reference signals.

In one embodiment, the first information block is used to determine a first-type reference signal that has a first-type relationship with a first one of the Q1 first-type signals from the Q2 first-type reference signals.

In one embodiment, the first information block is used to determine a first-type reference signal that has a first-type relationship with any one of the Q1 first-type signals from the Q2 first-type reference signals.

In one embodiment, the first information block is used to determine an order in which the Q2 first-type reference signals are applied.

In one embodiment, the first information block is used to determine an order in which the Q2 first-type reference signals are applied in a first-type relationship.

In one embodiment, the first information block is used to determine a first-type reference signal with number 0 among the Q2 first-type reference signals.

In one embodiment, the first information block is used to determine a first-type reference signal with number 1 among the Q1 first-type reference signals.

In one embodiment, the first information block is used to determine the first candidate reference signal.

In one embodiment, the first information block is used to determine the first candidate reference signal and the second candidate reference signal.

Embodiment 13A

Embodiment 13A illustrates a structure block diagram of a processing device used in a second node, as shown in FIG. 13A. In Embodiment 13A, a second node 1300A comprises a first transmitter 1301A.

In one embodiment, the first transmitter 1301A comprises at least one of the antenna 420, the transmitter/receiver 418, the multi-antenna transmitting processor 471, the transmitting processor 416, the controller/processor 475 or the memory 476 in FIG. 4 of the present application.

In Embodiment 13A, the first transmitter 1301A transmits a first information block and a second information block, and transmits a first radio signal in a first time-frequency resource set, the second information block being used to indicate the first time-frequency resource set; herein, the first information block is used to determine a first transmission configuration parameter group, the first transmission configuration parameter group comprising Q1 transmission configuration parameters, where the Q1 transmission configuration parameters are used together for receiving the first radio signal, Q1 being a positive integer greater than 1; the Q1 transmission configuration parameters are respectively used to determine Q1 reference signals, with a first reference signal being one of the Q1 reference signals; there is a first-type relationship between the first radio signal and the first reference signal, and there is a second-type relationship between the first radio signal and one of the Q1 reference signals other than the first reference signal, where the first-type relationship and the second-type relationship are different; a time interval between a time for receiving the second information block and a time for receiving the first time-frequency resource set is equal to a first time length, and a relative magnitude of the first time length and a first time threshold is used to determine the first reference signal out of the Q1 reference signals; the first time threshold comprises a time length of a positive integer number of multicarrier symbol(s).

In one embodiment, when the first time length is smaller than the first time threshold, the first reference signal is a reference signal determined by a transmission configuration parameter with a lowest index among the Q1 transmission configuration parameters.

In one embodiment, the first transmitter 1301A transmits a second radio signal, the second radio signal beginning to be transmitted before a start time of the first time-frequency resource set. Herein, Q2 transmission configuration parameters are used together for receiving the second radio signal, Q2 being a positive integer greater than 1; the Q2 transmission configuration parameters are respectively used to determine Q2 reference signals, with a second reference signal being one of the Q2 reference signals; there is the first-type relationship between the second radio signal and the second reference signal; when the first time length is smaller than the first time threshold, an index of a transmission configuration parameter associated with the second reference signal among the Q2 transmission configuration parameters is used to determine the first reference signal out of the Q1 reference signals.

In one embodiment, the second information block comprises first indication information; when the first time length is no smaller than the first time threshold, the first indication information is used to determine the first reference signal out of the Q1 reference signals.

In one embodiment, the first-type relationship comprises Doppler Shift Quasi Co-location relationship; the second-type relationship does not comprise a Doppler Shift Quasi Co-location relationship.

In one embodiment, the first information block is used to determine Q3 transmission configuration parameter groups, and any of the Q3 transmission configuration parameter groups comprises Q4 transmission configuration parameter(s), where Q3 is a positive integer greater than 1, and Q4 is a positive integer; when the first time length is smaller than the first time threshold, the first transmission configuration parameter group is a transmission configuration parameter group with a lowest index among the Q3 transmission configuration parameter groups that comprises the Q1 transmission configuration parameters.

In one embodiment, the first reference signal is used to determine a reception frequency of receiving the first radio signal, and each reference signal of the Q1 reference signals other than the first reference signal is not used to determine the reception frequency of receiving the first radio signal.

In one embodiment, the second node 1300A is a UE.

In one embodiment, the second node 1300A is a relay node.

In one embodiment, the second node 1300A is a base station.

In one embodiment, the second node 1300A is vehicle-mounted communication equipment.

In one embodiment, the second node 1300A is a UE supporting V2X communications.

In one embodiment, the second node 1300A is a relay node supporting V2X communications.

In one embodiment, the second node 1300A is a base station supporting IAB.

Embodiment 13B

Embodiment 13B illustrates a schematic diagram of time-domain resources respectively occupied by four first-type signals and reference signals that have first-type relationship respectively with the four first-type signals according to one embodiment of the present application, as shown in FIG. 13B. In FIG. 13B, four blank boxes are respectively used for representing time-frequency resources respectively occupied by a first-type signal #1, a first-type signal #2, a first-type signal #3 and a first-type signal #4, where #1, #2, #3 and #4 are used for respectively denoting numbers of a first, a second, a third and a fourth first-type signals after numbering the four first-type signals in chronological order. In Embodiment 13B, the first-type signal #1 and the first-type signal #2 both have a first-type relationship with the first reference signal; the first-type signal #3 and the first-type signal #4 both have a first-type relationship with the second reference signal. In Embodiment 13B, the Q1 is 4 and the Q2 is 2 in the present application.

In one embodiment, Q2 is 2, the Q2 first-type reference signals comprising a first candidate reference signal and a second candidate reference signal, when a number of the first signal in the Q1 first-type signals is no greater than floor (Q1/2), the first reference signal is the first candidate reference signal; when a number of the first signal in the Q1 first-type signals is greater than floor (Q1/2), the first reference signal is the second candidate reference signal, where floor denotes the operation of rounding down to a nearest integer, and "/" symbolizes division operation.

In one embodiment, Q2 is 2, the Q2 first-type reference signals comprising a first candidate reference signal and a second candidate reference signal, when a number of the first signal in the Q1 first-type signals is no greater than ceil (Q1/2), the first reference signal is the first candidate reference signal; when a number of the first signal in the Q1 first-type signals is greater than ceil (Q1/2), the first reference signal is the second candidate reference signal, where ceil denotes the operation of rounding up to a nearest integer, and "/" symbolizes division operation.

In one embodiment, Q2 is 2, the Q2 first-type reference signals comprising a first candidate reference signal and a second candidate reference signal, when a number of the first signal in the Q1 first-type signals is smaller than floor (Q1/2), the first reference signal is the first candidate reference signal; when a number of the first signal in the Q1 first-type signals is no smaller than floor (Q1/2), the first reference signal is the second candidate reference signal, where floor denotes the operation of rounding down to a nearest integer, and "/" symbolizes division operation.

In one embodiment, Q2 is 2, the Q2 first-type reference signals comprising a first candidate reference signal and a second candidate reference signal, when a number of the first signal in the Q1 first-type signals is smaller than ceil (Q1/2), the first reference signal is the first candidate reference signal; when a number of the first signal in the Q1 first-type signals is no smaller than ceil (Q1/2), the first reference signal is the second candidate reference signal, where ceil denotes the operation of rounding up to a nearest integer, and "/" symbolizes division operation.

In one embodiment, a number of the first signal among the Q1 first-type signals is K1, K1 being an integer between 0 and Q1−1; the Q2 first-type signals are numbered in sequence, and a number of any first-type reference signal among the Q2 first-type reference signals is K2, K2 being an integer between 0 and Q2−1; the number of the first reference signal in the Q2 first-type reference signals is: floor [K1/floor (Q1/Q2)], where floor denotes the operation of rounding down to a nearest integer, and "/" symbolizes division operation.

In one embodiment, a number of the first signal among the Q1 first-type signals is K1, K1 being an integer between 0 and Q1−1; the Q2 first-type signals are numbered in sequence, and a number of any first-type reference signal among the Q2 first-type reference signals is K2, K2 being an integer between 0 and Q2−1; the number of the first reference signal in the Q2 first-type reference signals is: min {floor [K1/floor (Q1/Q2)], Q2−1}, where floor denotes the operation of rounding down to a nearest integer, and "/" symbolizes division operation; min {floor [K1/floor (Q1/Q2)], Q2−1} represents a minimum value between floor [K1/floor (Q1/Q2)] and Q2−1.

In one embodiment, a number of the first signal among the Q1 first-type signals is K1, K1 being an integer between 0 and Q1−1; the Q2 first-type signals are numbered in sequence, and a number of any first-type reference signal among the Q2 first-type reference signals is K2, K2 being an integer between 0 and Q2−1; the number of the first reference signal in the Q2 first-type reference signals is: floor [K1/ceil (Q1/Q2)], where floor denotes the operation of rounding down to a nearest integer, ceil denotes the operation of rounding up to a nearest integer, and "/" symbolizes division operation.

In one embodiment, a number of the first signal among the Q1 first-type signals is K1, K1 being an integer between 0 and Q1−1; the Q2 first-type signals are numbered in sequence, and a number of any first-type reference signal among the Q2 first-type reference signals is K2, K2 being an integer between 1 and Q2; the number of the first reference signal in the Q2 first-type reference signals is: floor [K1/ floor (Q1/Q2)]+1, where floor denotes the operation of rounding down to a nearest integer, and "/" symbolizes division operation.

In one embodiment, a number of the first signal among the Q1 first-type signals is K1, K1 being an integer between 0 and Q1−1; the Q2 first-type signals are numbered in sequence, and a number of any first-type reference signal among the Q2 first-type reference signals is K2, K2 being an integer between 1 and Q2; the number of the first reference signal in the Q2 first-type reference signals is: min {floor [K1/floor (Q1/Q2)]+1, Q2}, where floor denotes the operation of rounding down to a nearest integer, and "/" symbolizes division operation; min {floor [K1/floor (Q1/Q2)]+1, Q2} represents a minimum value between floor [K1/floor (Q1/Q2)]+1 and Q2.

In one embodiment, a number of the first signal among the Q1 first-type signals is K1, K1 being an integer between 0 and Q1−1; the Q2 first-type signals are numbered in sequence, and a number of any first-type reference signal among the Q2 first-type reference signals is K2, K2 being an integer between 1 and Q2; the number of the first reference signal in the Q2 first-type reference signals is: floor [K1/ceil (Q1/Q2)]+1, where floor denotes the operation of rounding down to a nearest integer, ceil denotes the operation of rounding up to a nearest integer, and "/" symbolizes division operation.

In one embodiment, a number of the first signal among the Q1 first-type signals is K1, K1 being an integer between 1 and Q1; the Q2 first-type signals are numbered in sequence, and a number of any first-type reference signal among the Q2 first-type reference signals is K2, K2 being an integer between 1 and Q2; the number of the first reference signal in the Q2 first-type reference signals is: floor [(K1−1)/ceil (Q1/Q2)]+1, where floor denotes the operation of rounding down to a nearest integer, ceil denotes the operation of rounding up to a nearest integer, and "/" symbolizes division operation.

In one embodiment, a number of the first signal among the Q1 first-type signals is K1, K1 being an integer between 1 and Q1; the Q2 first-type signals are numbered in sequence, and a number of any first-type reference signal among the Q2 first-type reference signals is K2, K2 being an integer between 1 and Q2; the number of the first reference signal in the Q2 first-type reference signals is: floor [(K1−1)/floor (Q1/Q2)]+1, where floor denotes the operation of rounding down to a nearest integer, and "/" symbolizes division operation.

In one embodiment, a number of the first signal among the Q1 first-type signals is K1, K1 being an integer between 1 and Q1; the Q2 first-type signals are numbered in sequence, and a number of any first-type reference signal among the Q2 first-type reference signals is K2, K2 being an integer between 1 and Q2; the number of the first reference signal in the Q2 first-type reference signals is: min {floor [(K1−1)/floor (Q1/Q2)]+1, Q2}, where floor denotes the operation of rounding down to a nearest integer, and "/" symbolizes division operation; min {floor [(K1−1)/floor (Q1/Q2)]+1, Q2} represents a minimum value between floor [(K1−1)/floor (Q1/Q2)]+1 and Q2.

In one embodiment, a number of the first signal among the Q1 first-type signals is K1, K1 being an integer between 1 and Q1; the Q2 first-type signals are numbered in sequence, and a number of any first-type reference signal among the Q2 first-type reference signals is K2, K2 being an integer between 0 and Q2−1; the number of the first reference signal in the Q2 first-type reference signals is: floor [(K1−1)/ceil (Q1/Q2)], where floor denotes the operation of rounding down to a nearest integer, ceil denotes the operation of rounding up to a nearest integer, and "/" symbolizes division operation.

In one embodiment, a number of the first signal among the Q1 first-type signals is K1, K1 being an integer between 1 and Q1; the Q2 first-type signals are numbered in sequence, and a number of any first-type reference signal among the Q2 first-type reference signals is K2, K2 being an integer between 0 and Q2−1; the number of the first reference signal in the Q2 first-type reference signals is: floor [(K1−1)/floor (Q1/Q2)], where floor denotes the operation of rounding down to a nearest integer, and "/" symbolizes division operation.

In one embodiment, a number of the first signal among the Q1 first-type signals is K1, K1 being an integer between 1 and Q1; the Q2 first-type signals are numbered in sequence, and a number of any first-type reference signal among the Q2 first-type reference signals is K2, K2 being an integer between 0 and Q2−1; the number of the first reference signal in the Q2 first-type reference signals is: min {floor [(K1−1)/floor (Q1/Q2)], Q2}, where floor denotes the operation of rounding down to a nearest integer, and "/" symbolizes division operation; min {floor [(K1−1)/floor (Q1/Q2)], Q2} represents a minimum value between floor [(K1−1)/floor (Q1/Q2)] and Q2.

Embodiment 14

Embodiment 14 illustrates a structure block diagram of a processing device used in a first node, as shown in FIG. 14. In Embodiment 14, a first node 1400 comprises a first receiver 1401.

In one embodiment, the first receiver 1401 comprises at least one of the antenna 452, the transmitter/receiver 454, the multi-antenna receiving processor 458, the receiving processor 456, the controller/processor 459, the memory 460 or the data source 467 in FIG. 4 of the present application.

In Embodiment 14, the first receiver 1401 receives a first information block; the first receiver 1401 receives Q1 first-type signals respectively in Q1 first-type time-frequency resource sets, where Q1 is a positive integer greater than 1, the first information block being used to determine the Q1 first-type time-frequency resource sets; herein, a first data block is used for generating the Q1 first-type signals; the first information block is used to determine Q2 transmission configuration parameters, the Q2 transmission configuration parameters being used together for receiving the Q1 first-type signals, Q2 being a positive integer greater than 1; the Q2 transmission configuration parameters are respectively used to determine Q2 first-type reference signals; a first signal is one of the Q1 first-type signals; a first reference signal is one of the Q2 first-type reference signals; there is a first-type relationship between the first signal and the first reference signal, the first-type relationship being a candidate relationship among Q3 candidate relationships, where Q3 is a positive integer greater than 1; a position of the first signal in the Q1 first-type signals is used to determine the first reference signal out of the Q2 first-type reference signals.

In one embodiment, the first node 1400 is a UE.
In one embodiment, the first node 1400 is a relay node.
In one embodiment, the first node 1400 is a base station.
In one embodiment, the first node 1400 is vehicle-mounted communication equipment.
In one embodiment, the first node 1400 is a UE supporting V2X communications.
In one embodiment, the first node 1400 is a relay node supporting V2X communications.

In one embodiment, the first node 1400 is a base station supporting IAB.

Embodiment 15

Embodiment 15 illustrates a structure block diagram of a processing device used in a second node according to one embodiment of the present application, as shown in FIG. 15. In Embodiment 15, a second node 1500 comprises a first transmitter 1501.

In one embodiment, the first transmitter 1501 comprises at least one of the antenna 420, the transmitter/receiver 418, the multi-antenna transmitting processor 471, the transmitting processor 416, the controller/processor 475 or the memory 476 in FIG. 4 of the present application.

In Embodiment 15, the first transmitter 1501 transmits a first information block; the first transmitter 1501 transmits Q1 first-type signals respectively in Q1 first-type time-frequency resource sets, where Q1 is a positive integer greater than 1, the first information block being used to determine the Q1 first-type time-frequency resource sets; herein, a first data block is used for generating the Q1 first-type signals; the first information block is used to determine Q2 transmission configuration parameters, the Q2 transmission configuration parameters being used together for receiving the Q1 first-type signals, Q2 being a positive integer greater than 1; the Q2 transmission configuration parameters are respectively used to determine Q2 first-type reference signals; a first signal is one of the Q1 first-type signals; a first reference signal is one of the Q2 first-type reference signals; there is a first-type relationship between the first signal and the first reference signal, the first-type relationship being a candidate relationship among Q3 candidate relationships, where Q3 is a positive integer greater than 1; a position of the first signal in the Q1 first-type signals is used to determine the first reference signal out of the Q2 first-type reference signals.

In one embodiment, a second-type relationship is a candidate relationship among the Q3 candidate relationships, the second-type relationship being different from the first-type relationship.

In one embodiment, a second reference signal is a first-type reference signal among the Q2 first-type reference signals, where there is a second-type relationship between the first signal and the second reference signal.

In one embodiment, the first information block is used to determine the first reference signal and the second reference signal out of the Q2 first-type reference signals.

In one embodiment, there is a second-type relationship between the first signal and any first-type reference signal among the Q2 first-type reference signals other than the first reference signal.

In one embodiment, the first-type relationship comprises a first-type quasi co-location relationship, the first-type quasi co-location relationship comprising a Doppler Shift Quasi Co-location relationship; the second-type relationship comprises a second-type quasi co-location relationship, the second-type quasi co-location relationship not comprising a Doppler Shift Quasi Co-location relationship.

In one embodiment, the first reference signal is used to determine a frequency of the first signal, while the second reference signal is not used to determine a frequency of the first signal.

In one embodiment, the second node 1500 is a UE.
In one embodiment, the second node 1500 is a relay node.
In one embodiment, the second node 1500 is a base station.

In one embodiment, the second node 1500 is vehicle-mounted communication equipment.

In one embodiment, the second node 1500 is a UE supporting V2X communications.

In one embodiment, the second node 1500 is a relay node supporting V2X communications.

In one embodiment, the second node 1500 is a base station supporting IAB.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node in the present application includes but is not limited to mobile phones, tablet computers, notebooks, network cards, low-consumption equipment, enhanced MTC (eMTC) terminals, NB-IoT terminals, vehicle-mounted communication equipment, aircrafts, airplanes, unmanned aerial vehicles, telecontrolled aircrafts, etc. The second node in the present application includes but is not limited to mobile phones, tablet computers, notebooks, network cards, low-consumption equipment, enhanced MTC (eMTC) terminals, NB-IoT terminals, vehicle-mounted communication equipment, aircrafts, airplanes, unmanned aerial vehicles, telecontrolled aircrafts, etc. The UE or terminal in the present application includes but is not limited to mobile phones, tablet computers, notebooks, network cards, low-consumption equipment, enhanced MTC (eMTC) terminals, NB-IoT terminals, vehicle-mounted communication equipment, aircrafts, airplanes, unmanned aerial vehicles, telecontrolled aircrafts, etc. The base station in the present application includes but is not limited to macro-cellular base stations, micro-cellular base stations, home base stations, relay base station, eNB, gNB, Transmitter Receiver Point (TRP), GNSS, relay satellite, satellite base station, airborne base station and other radio communication equipment, as well as test equipment, such as transceiving device simulating partial functions of the base station and a signaling test instrument, etc.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE), comprising:
a receiver configured to receive:
  radio resource control (RRC) information indicating a Transmission Configuration Indicator (TCI) state group that includes a first TCI state that indicates a first quasi co-location (QCL) relationship of a first type for a first reference signal and a second TCI state that indicates a second QCL relationship of a second type for a second reference signal;
  downlink control information (DCI) that indicates time-frequency resources; and
  a physical downlink shared channel (PDSCH) in the time-frequency resources, wherein the UE is configured to receive the PDSCH based on a TCI state of the TCI state group, wherein the TCI state is determined based on comparing a time difference between a reception time of the DCI and a reception time of the PDSCH with a threshold.

2. The UE according to claim 1, wherein on a condition that the time difference is less than the threshold, the TCI state has a lowest index of the TCI state group.

3. The UE according to claim 1, wherein:
the receiver is configured to receive a signal having a transmission start time that precedes a start time of the time-frequency resources.

4. The UE according to claim 1, wherein on a condition that the time difference is greater than or equal to the threshold, the TCI state is determined based on information included in the DCI.

5. The UE according to claim 1, wherein the first QCL relationship of the first type includes a Doppler shift QCL relationship, and the second QCL relationship of the second type does not include a Doppler shift QCL relationship.

6. The UE according to claim 1, wherein the RRC information indicates a plurality of TCI state groups, and a group of the plurality of TCI state groups includes a plurality of TCI states.

7. The UE according to claim 1, wherein a reception frequency of the PDSCH is based on a reference signal associated with the TCI state and reference signals of remaining TCI states of the TCI state group are not used to determine the reception frequency.

8. The UE according to claim 1, wherein the TCI state is determined based the time difference between the reception time of the DCI and the reception time of the PDSCH being greater than or equal to the threshold.

9. The UE according to claim 1, wherein the threshold is configured by a timeDurationForQCL field in RRC signaling.

10. A base station, comprising:
a transmitter configured to transmit:
  a radio resource control (RRC) information indicating a Transmission Configuration Indicator (TCI) state group that includes a first TCI state that indicates a first quasi co-location (QCL) relationship of a first type for a first reference signal and a second TCI state that indicates a second QCL relationship of a second type for a second reference signal;
  downlink control information (DCI) that indicates time-frequency resources; and
  a physical downlink shared channel (PDSCH) in the time-frequency resources,
wherein the PDSCH is received based on a TCI state of the TCI state group, and wherein the TCI state is determined based on comparing a time difference between a reception time of the DCI and a reception time of the PDSCH with a threshold.

11. The base station according to claim 10, wherein on a condition that the time difference is less than the threshold, the TCI state has a lowest index of the TCI state group.

12. A method, comprising:
receiving radio resource control (RRC) information indicating a Transmission Configuration Indicator (TCI) state group that includes a first TCI state that indicates a first quasi co-location (QCL) relationship of a first type for a first reference signal and a second TCI state that indicates a second QCL relationship of a second type for a second reference signal;
receiving downlink control information (DCI) that indicates time-frequency resources; and receiving a physical downlink shared channel (PDSCH) in the time-frequency resources, wherein the PDSCH is received based on a TCI state of the TCI state group, wherein the TCI state is determined based on comparing a time difference between a reception time of the DCI and a reception time of the PDSCH with a threshold.

13. The method according to claim 12, wherein on a condition that the time difference is less than the threshold, the TCI state has a lowest index of the TCI state group.

14. The method according to claim 12, comprising:

receiving a signal having a transmission start time that precedes a start time of the time-frequency resources.

15. The method according to claim 12, wherein on a condition that the time difference is greater than or equal to the threshold, the TCI state is determined based on information included in the DCI.

16. The method according to claim 12, wherein the first QCL relationship of the first type includes a Doppler shift QCL relationship, and the second QCL relationship of the second type does not include a Doppler shift QCL relationship.

17. The method according to claim 12, wherein the RRC information indicates a plurality of TCI state groups, and a group of the plurality of TCI state groups includes a plurality of TCI states.

18. The method according to claim 12, wherein a reception frequency of the PDSCH is based on a reference signal associated with the TCI state and reference signals of remaining TCI states of the TCI state group are not used to determine the reception frequency.

19. The method according to claim 12, wherein on a condition that the time difference is less than the threshold, the TCI state has a lowest index of the TCI state group.

20. The method according to claim 12, wherein the threshold is configured by a timeDurationForQCL field in RRC signaling.

* * * * *